(12) United States Patent
Yang et al.

(10) Patent No.: US 12,153,736 B2
(45) Date of Patent: Nov. 26, 2024

(54) ELECTRONIC APPARATUS AND METHOD OF OPERATION ELECTRONIC APPARATUS

(71) Applicants: Beijing BOE Technology Development Co., Ltd., Beijing (CN); BOE Technology Group Co., Ltd., Beijing (CN)

(72) Inventors: Zhiming Yang, Beijing (CN); Kai Geng, Beijing (CN); Xiaotong Liu, Beijing (CN); Jijing Huang, Beijing (CN); Xiaohui Ma, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/004,888

(22) PCT Filed: Feb. 17, 2022

(86) PCT No.: PCT/CN2022/076677
§ 371 (c)(1),
(2) Date: Jan. 10, 2023

(87) PCT Pub. No.: WO2023/155104
PCT Pub. Date: Aug. 24, 2023

(65) Prior Publication Data
US 2024/0248534 A1    Jul. 25, 2024

(51) Int. Cl.
*G06F 3/01* (2006.01)
*G06F 3/041* (2006.01)
*G06F 3/044* (2006.01)

(52) U.S. Cl.
CPC ............ *G06F 3/016* (2013.01); *G06F 3/0416* (2013.01); *G06F 3/044* (2013.01)

(58) Field of Classification Search
CPC ........................................... G06F 3/016
See application file for complete search history.

(56) References Cited

U.S. PATENT DOCUMENTS

| | | | | |
|---|---|---|---|---|
| 10,268,273 | B1 * | 4/2019 | Sundaram | G06F 3/0346 |
| 10,289,199 | B2 * | 5/2019 | Hoellwarth | G06F 3/041 |

(Continued)

FOREIGN PATENT DOCUMENTS

| | | |
|---|---|---|
| CN | 101632054 A | 1/2010 |
| CN | 102349041 A | 2/2012 |

(Continued)

OTHER PUBLICATIONS

International Search Report & Written Opinion mailed Nov. 3, 2022, regarding PCT/CN2022/076677.

*Primary Examiner* — Amy Onyekaba
(74) *Attorney, Agent, or Firm* — Intellectual Valley Law, P.C.

(57) ABSTRACT

An electronic apparatus is provided. The electronic apparatus includes a touch control device configured to detect a touch; a processor configured to classify the touch into one of at least two modes; a haptic device configured to produce a haptic action accompanying an individual touch action; and a driving circuit configured to drive the haptic device. The processor is configured to, upon determination that the touch is of a first mode, transmit a first driving signal to the driving circuit. The driving circuit is configured to, upon receiving the first driving signal, drive the haptic device to produce a plurality of sub-actions cumulatively achieving at least a part of the haptic action accompanying the individual touch action. At least two sub-actions of the plurality of sub-actions are different from each other in at least one parameter.

20 Claims, 29 Drawing Sheets

(56) References Cited

U.S. PATENT DOCUMENTS

| | | | |
|---|---|---|---|
| 11,720,217 B2* | 8/2023 | Jeon | G06F 3/0416 |
| | | | 345/156 |
| 11,768,542 B1* | 9/2023 | Dani | G06F 3/0416 |
| | | | 345/174 |
| 2008/0024459 A1* | 1/2008 | Poupyrev | G06F 3/0488 |
| | | | 345/173 |
| 2011/0115716 A1* | 5/2011 | Fritzley | G06F 3/0485 |
| | | | 340/407.1 |
| 2013/0229384 A1* | 9/2013 | Adachi | G06F 3/041 |
| | | | 345/174 |
| 2014/0198068 A1* | 7/2014 | Lee | G06F 3/04886 |
| | | | 345/173 |
| 2014/0240110 A1* | 8/2014 | Suzuki | G06F 3/0488 |
| | | | 340/407.1 |
| 2015/0153830 A1* | 6/2015 | Hirose | G06F 3/016 |
| | | | 345/173 |
| 2015/0261296 A1 | 9/2015 | Yoshikawa | |
| 2016/0132117 A1* | 5/2016 | Adachi | G06F 3/041 |
| | | | 345/173 |
| 2016/0162025 A1 | 6/2016 | Shah | |
| 2016/0202764 A1* | 7/2016 | Kamata | G06F 3/04847 |
| | | | 715/702 |
| 2017/0168574 A1* | 6/2017 | Zhang | G06F 3/016 |
| 2017/0168579 A1* | 6/2017 | Birnbaum | G06F 1/1613 |
| 2018/0301140 A1* | 10/2018 | Turcott | G06N 3/044 |
| 2019/0087002 A1* | 3/2019 | Mani | G06T 7/246 |
| 2019/0212819 A1* | 7/2019 | Piao | G06F 3/1423 |
| 2019/0243489 A1* | 8/2019 | Xu | G06F 3/04186 |
| 2021/0004116 A1* | 1/2021 | Nakai | G06F 3/03547 |
| 2021/0141454 A1* | 5/2021 | Ko | G06F 3/04146 |
| 2021/0141459 A1 | 5/2021 | Wang et al. | |
| 2021/0192904 A1* | 6/2021 | Moussette | H04L 51/224 |
| 2021/0294417 A1* | 9/2021 | Chu Ke | G06F 3/0412 |
| 2022/0244827 A1* | 8/2022 | Riihiaho | G06F 3/0416 |
| 2022/0357830 A1* | 11/2022 | Haga | G06F 3/04164 |
| 2022/0371051 A1* | 11/2022 | Kim | H04R 1/2803 |
| 2022/0408181 A1* | 12/2022 | Hendrix | H03F 1/56 |
| 2023/0217184 A1* | 7/2023 | Nam | G10K 9/122 |
| | | | 310/324 |
| 2024/0061509 A1* | 2/2024 | Sato | G06F 3/01 |
| 2024/0176423 A1* | 5/2024 | Kang | G06F 1/1643 |

FOREIGN PATENT DOCUMENTS

| | | |
|---|---|---|
| CN | 104238753 A | 12/2014 |
| CN | 104915051 A | 9/2015 |
| CN | 105677014 A | 6/2016 |
| CN | 107229324 A | 10/2017 |
| CN | 110622108 A | 12/2019 |
| JP | 2013134547 A | 7/2013 |
| WO | 2010105011 A1 | 9/2010 |
| WO | 2017177007 A1 | 10/2017 |

* cited by examiner

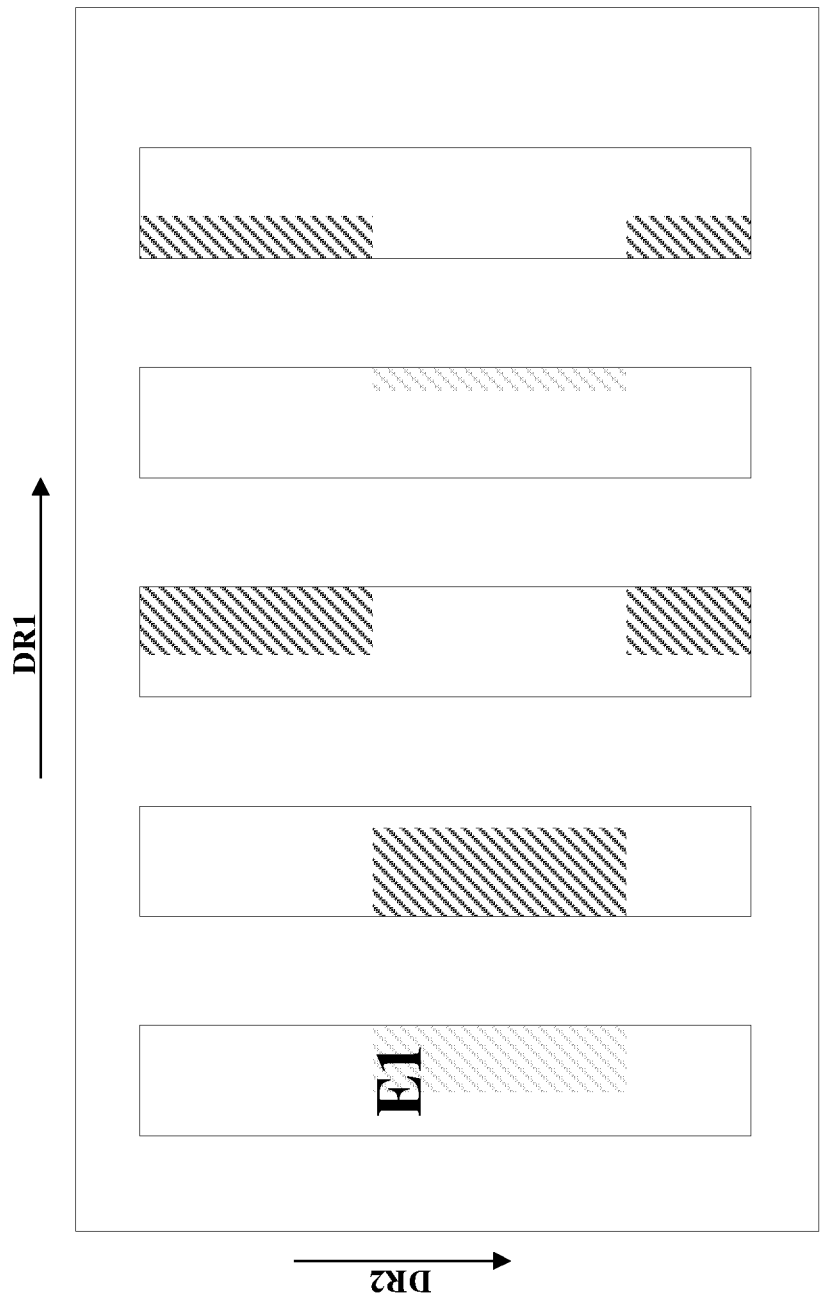

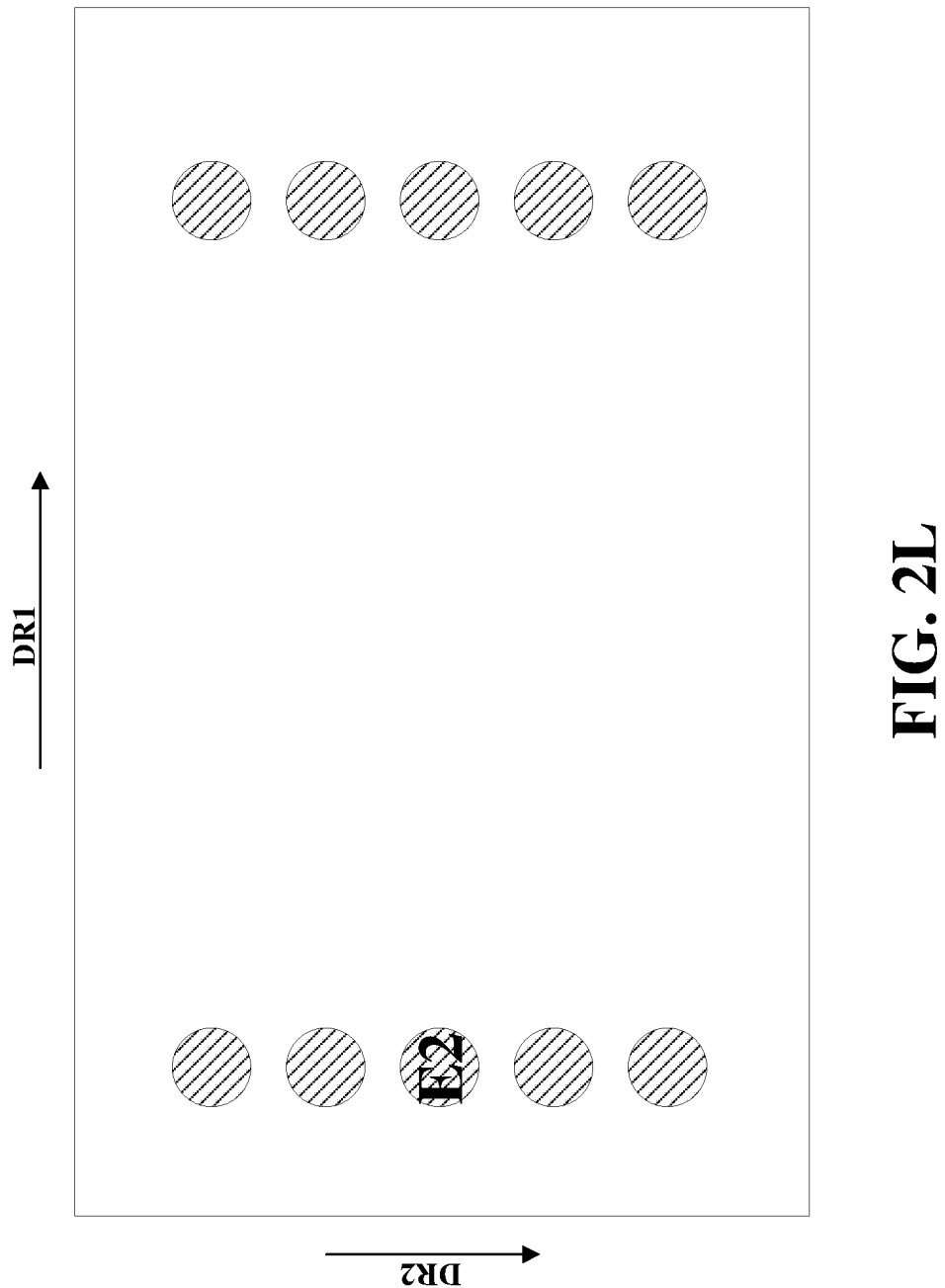

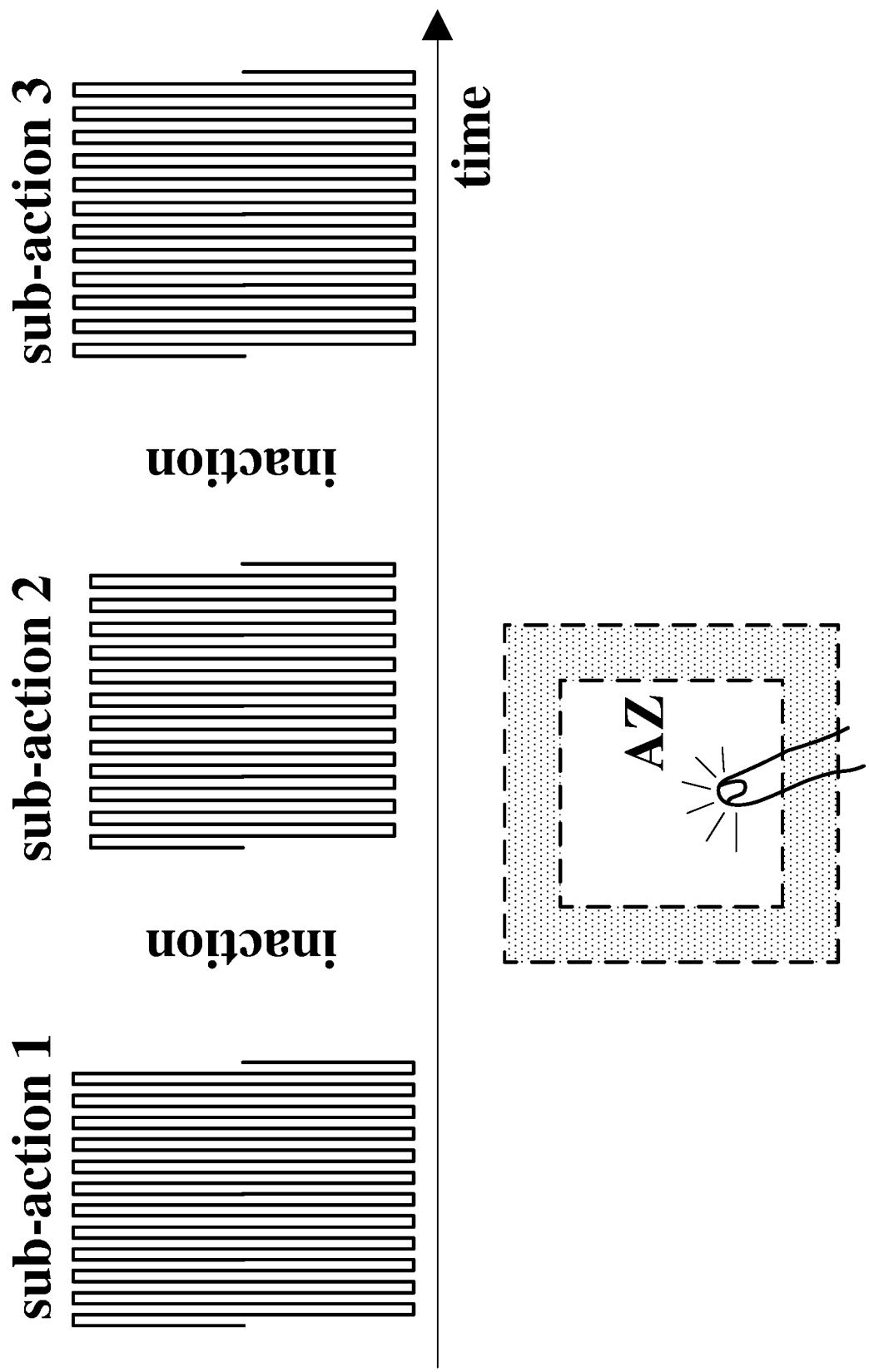

ELECTRONIC APPARATUS AND METHOD OF OPERATION ELECTRONIC APPARATUS

CROSS-REFERENCE TO RELATED APPLICATION

This application is a national stage application under 35 U.S.C. § 371 of International Application No. PCT/CN2022/076677, filed Feb. 17, 2022, the contents of which are incorporated by reference in the entirety.

TECHNICAL FIELD

The present invention relates to haptic technology, more particularly, to an electronic apparatus and a method of operating an electronic apparatus.

BACKGROUND

Haptic technology enables device-human interaction. Haptic technology may be classified into two categories, including vibration feedback, and haptic reproduction. Haptic reproduction technology enables perception of characteristics of an object through a touch, achieving highly efficient and natural interaction in a multi-media environment.

SUMMARY

In one aspect, the present disclosure provides an electronic apparatus, comprising a touch control device configured to detect a touch; a processor configured to classify the touch into one of at least two modes; a haptic device configured to produce a haptic action accompanying an individual touch action; and a driving circuit configured to drive the haptic device; wherein the processor is configured to, upon determination that the touch is of a first mode, transmit a first driving signal to the driving circuit; the driving circuit is configured to, upon receiving the first driving signal, drive the haptic device to produce a plurality of sub-actions cumulatively achieving at least a part of the haptic action accompanying the individual touch action; and at least two sub-actions of the plurality of sub-actions are different from each other in at least one parameter.

Optionally, at least two consecutive sub-actions of the plurality of sub-actions are different from each other in at least one parameters.

Optionally, the at least one parameter is a driving voltage of a signal provided to the haptic device for a respective sub-action of the plurality of sub-actions, or a driving frequency of a signal provided to the haptic device for the respective sub-action, or a driving duration for the respective sub-action, or a combination thereof.

Optionally, the haptic action is a continuous action, and the plurality of sub-actions are consecutive sub-actions without interruption.

Optionally, the plurality of sub-actions are characterized by a plurality of driving voltages and/or a plurality of driving frequencies for the plurality of sub-actions, respectively; driving voltages and/or driving frequencies for any two consecutive sub-actions of the plurality of sub-actions are different from each other; and differences between the plurality of driving voltages and/or the plurality of driving frequencies are within a threshold range.

Optionally, a value of a respective driving voltage of the plurality of driving voltages is an addition of a base voltage value and a randomized voltage value; base voltage values of the plurality of driving voltages are the same; and differences between randomized voltage values of the plurality of driving voltages are within a first threshold range.

Optionally, a value of a respective driving frequency of the plurality of driving frequencies is an addition of a base frequency value and a randomized frequency value; base frequency values of the plurality of driving frequencies are the same; and differences between randomized frequency values of the plurality of driving frequencies are within a third threshold range.

Optionally, the haptic action further comprises at least one inaction; a respective inaction is between two consecutive sub-actions; and driving signal for the haptic action accompanying the individual touch action is temporarily discontinued during the at least one inaction.

Optionally, the plurality of sub-actions are characterized by a plurality of driving voltages and/or a plurality of driving frequencies for the plurality of sub-actions, respectively; driving voltages and/or driving frequencies for at least two sub-actions of the plurality of sub-actions are different from each other; and differences between the plurality of driving voltages and/or the plurality of driving frequencies are within a threshold range.

Optionally, a value of a respective driving voltage of the plurality of driving voltages is an addition of a base voltage value and a randomized voltage value; base voltage values of the plurality of driving voltages are the same; and differences between randomized voltage values of the plurality of driving voltages are within a first threshold range.

Optionally, a value of a respective driving frequency of the plurality of driving frequencies is an addition of a base frequency value and a randomized frequency value; base frequency values of the plurality of driving frequencies are the same; and differences between randomized frequency values of the plurality of driving frequencies are within a third threshold range.

Optionally, at least two driving durations of a plurality of driving durations for the plurality of sub-actions are different from each other.

Optionally, a plurality of driving durations for the plurality of sub-actions are the same.

Optionally, the plurality of sub-actions are characterized by a plurality of driving durations for the plurality of sub-actions, respectively; driving durations for at least two sub-actions of the plurality of sub-actions are different from each other; and differences between the plurality of driving durations are within a second threshold range.

Optionally, a value of a respective driving duration of the plurality of driving durations is an addition of a base duration value and a randomized duration value; base duration values of the plurality of driving durations are the same; and differences between randomized duration values of the plurality of driving durations are within the second threshold range.

Optionally, at least two driving voltages of a plurality of driving voltages and/or at least two driving frequencies of a plurality of driving frequencies for the plurality of sub-actions are different from each other.

Optionally, a plurality of driving voltages and/or a plurality of driving frequencies for the plurality of sub-actions are the same.

Optionally, the processor is configured to determine a touch characteristic of the touch thereby classifying the touch into one of the at least two modes.

Optionally, the processor is configured to determine a touch contact area or a touch duration or a combination thereof, thereby classifying the touch into one of the at least two modes.

Optionally, the processor is configured to determine whether a touch duration is greater than a threshold duration; and upon determination that the touch duration is greater than the threshold duration, the processor is configured to classify the touch into the first mode.

Optionally, the processor is configured to determine whether a touch contact area is greater than a threshold area; and upon determination that the touch contact area is greater than the threshold area, the processor is configured to classify the touch into the first mode.

Optionally, the individual touch action is activation of a virtual object.

In another aspect, the present disclosure provides a method of operating an electronic apparatus, comprising detecting a touch; classifying the touch into one of at least two modes; producing, by a haptic device, a haptic action accompanying an individual touch action; driving the haptic device by a driving circuit; upon determination that the touch is of a first mode, transmitting a first driving signal to the driving circuit; and upon receiving the first driving signal by the driving circuit, driving the haptic device to produce a plurality of sub-actions cumulatively achieving at least a part of the haptic action accompanying the individual touch action; wherein at least two sub-actions of the plurality of sub-actions are different from each other in at least one parameter.

BRIEF DESCRIPTION OF THE FIGURES

The following drawings are merely examples for illustrative purposes according to various disclosed embodiments and are not intended to limit the scope of the present invention.

FIG. 2F is a schematic diagram illustrating the structure of a first electrode layer in a haptic device depicted in FIG. 2E.

FIG. 2L is a schematic diagram illustrating the structure of a second electrode layer in a haptic device depicted in FIG. 2I.

FIG. 4C illustrates a plurality of sub-actions cumulatively achieving a haptic action accompanying an individual touch action in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an electronic apparatus and a method of operating an electronic apparatus that substantially obviate one or more of the problems due to limitations and disadvantages of the related art. In one aspect, the present disclosure provides an electronic apparatus. In some embodiments, the electronic apparatus includes a touch control device configured to detect a touch; a processor configured to classify the touch into one of at least two modes; a haptic device configured to produce a haptic action accompanying an individual touch action; and a driving circuit configured to drive the haptic device. The processor is configured to, upon determination that the touch is of a first mode, transmit a first driving signal to the driving circuit. The driving circuit is configured to, upon receiving the first driving signal, drive the haptic device to produce a plurality of sub-actions cumulatively achieving at least a part of the haptic action accompanying the individual touch action. At least two sub-actions of the plurality of sub-actions are different from each other in at least one parameter.

Figure 1:
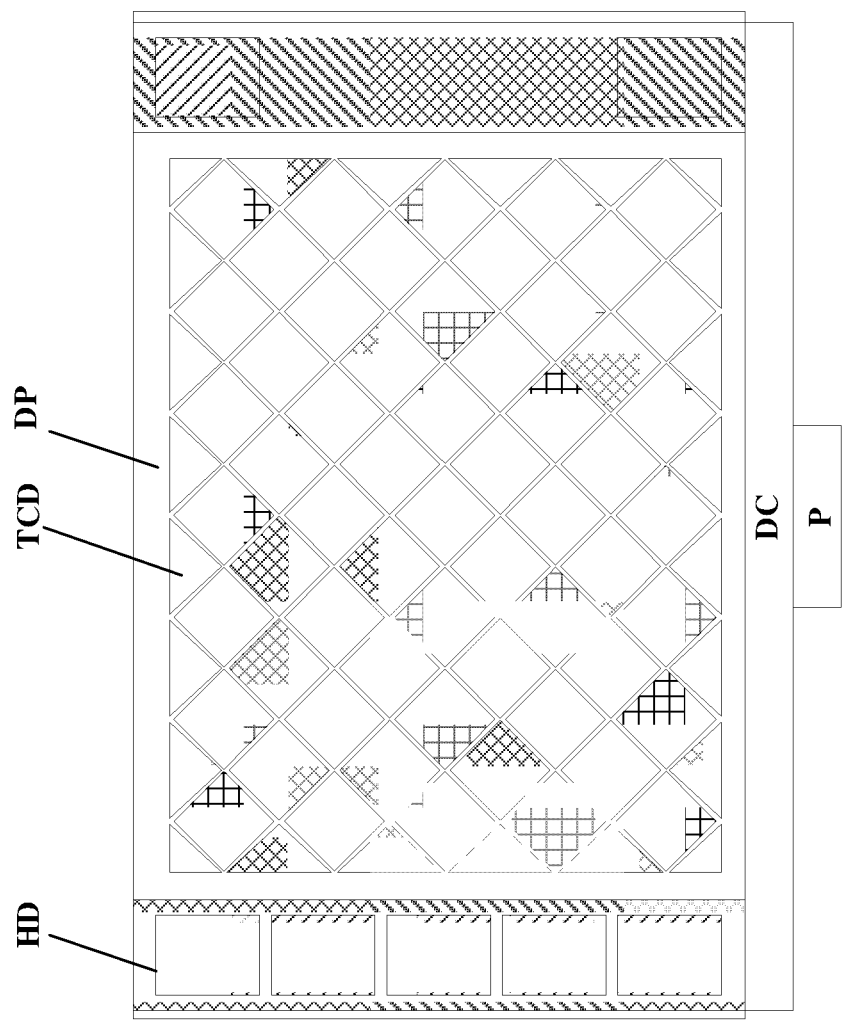
FIG. 1 is a schematic diagram illustrating the structure of an electronic apparatus in some embodiments according to the present disclosure.

FIG. 1 is a schematic diagram illustrating the structure of an electronic apparatus in some embodiments according to the present disclosure. Referring to FIG. 1, the electronic apparatus in some embodiments includes a touch control structure TCD which may include a touch electrode layer. Various appropriate touch control structures may be used in the present electronic apparatus. Examples of touch control structures include a mutual-capacitive type touch control structure and a self-capacitive type touch control structure. The touch control structure TCD is configured to detect a position of a touch on a surface of the electronic apparatus. The electronic apparatus in some embodiments further includes a processor P. The processor P is in communication with the touch control structure TCD. In some embodiments, the processor P is configured to derive touch information such as a touch position, a touch contact area, and/or a touch duration of the touch based on a touch signal detected by the touch control structure TCD. In some embodiments, the processor P is configured to determine a touch characteristic of the touch thereby classifying the touch into one of the at least two modes.

In some embodiments, the electronic apparatus further includes a haptic device HD and a driving circuit DC. The driving circuit DC is configured to drive the haptic device HD to produce a haptic action, for example, on the same surface on which a touch is detected. The processor P is in communication with the driving circuit DC. As discussed above, the processor P is configured to transmit a first driving signal to a driving circuit DC, upon determination that the touch is of a first mode. In some embodiments, upon receiving the first driving signal, the driving circuit DC is configured to drive the haptic device to produce a plurality of sub-actions cumulatively achieving at least a part of the haptic action accompanying the individual touch action. Optionally, at least two sub-actions of the plurality of sub-actions are different from each other in at least one parameter.

The processor P may include any appropriate processor or processors. Further, the processor P may include multiple cores for multi-thread or parallel processing. The processor P may execute sequences of computer program instructions to perform various processes. The storage medium may include memory modules, such as ROM, RAM, flash memory modules, and mass storages, such as CD-ROM and hard disk, etc. A storage medium may store computer programs for implementing various processes when the computer programs are executed by the processor P. For example, the storage medium may store computer programs for implementing various algorithms when the computer programs are executed by the processor P.

Figure 2A:
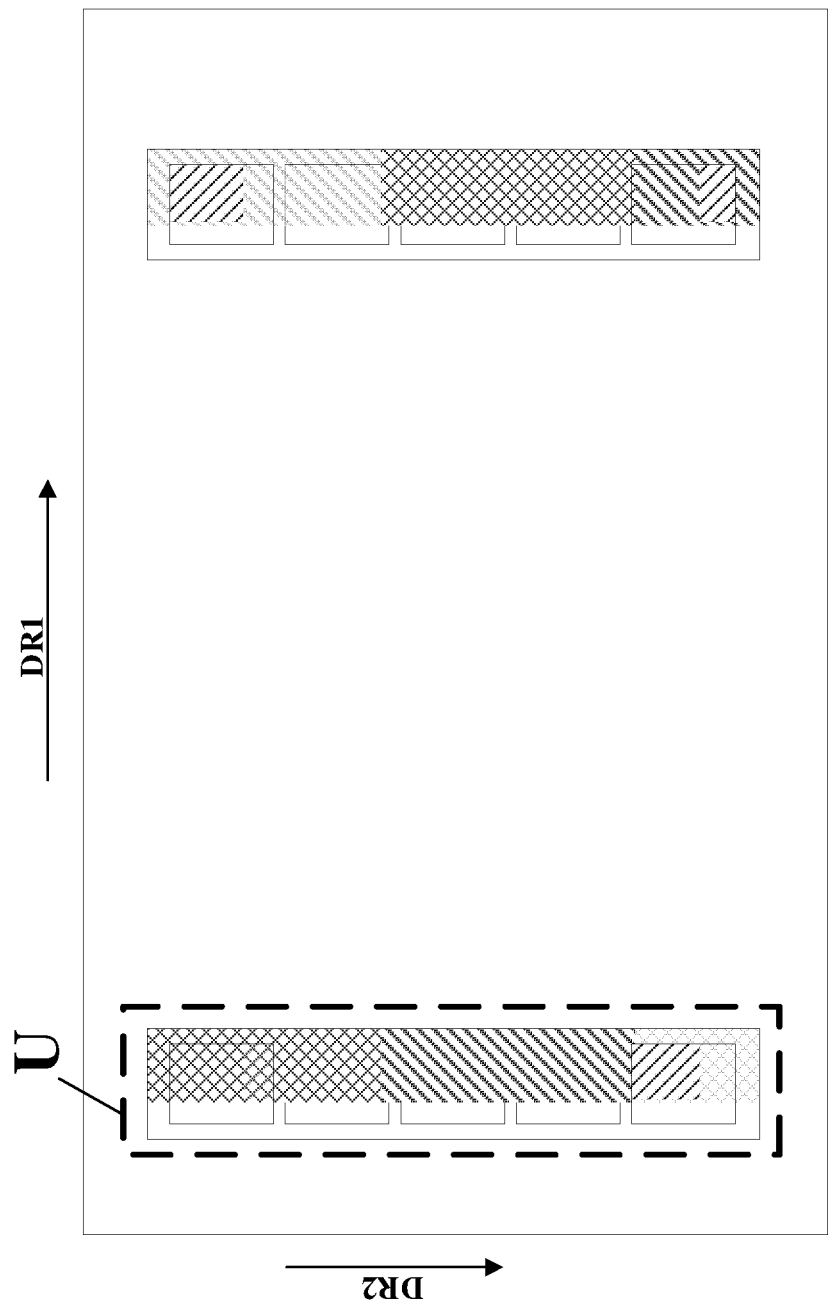
FIG. 2A is a schematic diagram illustrating the structure of a haptic device in some embodiments according to the present disclosure.
Figure 2B:
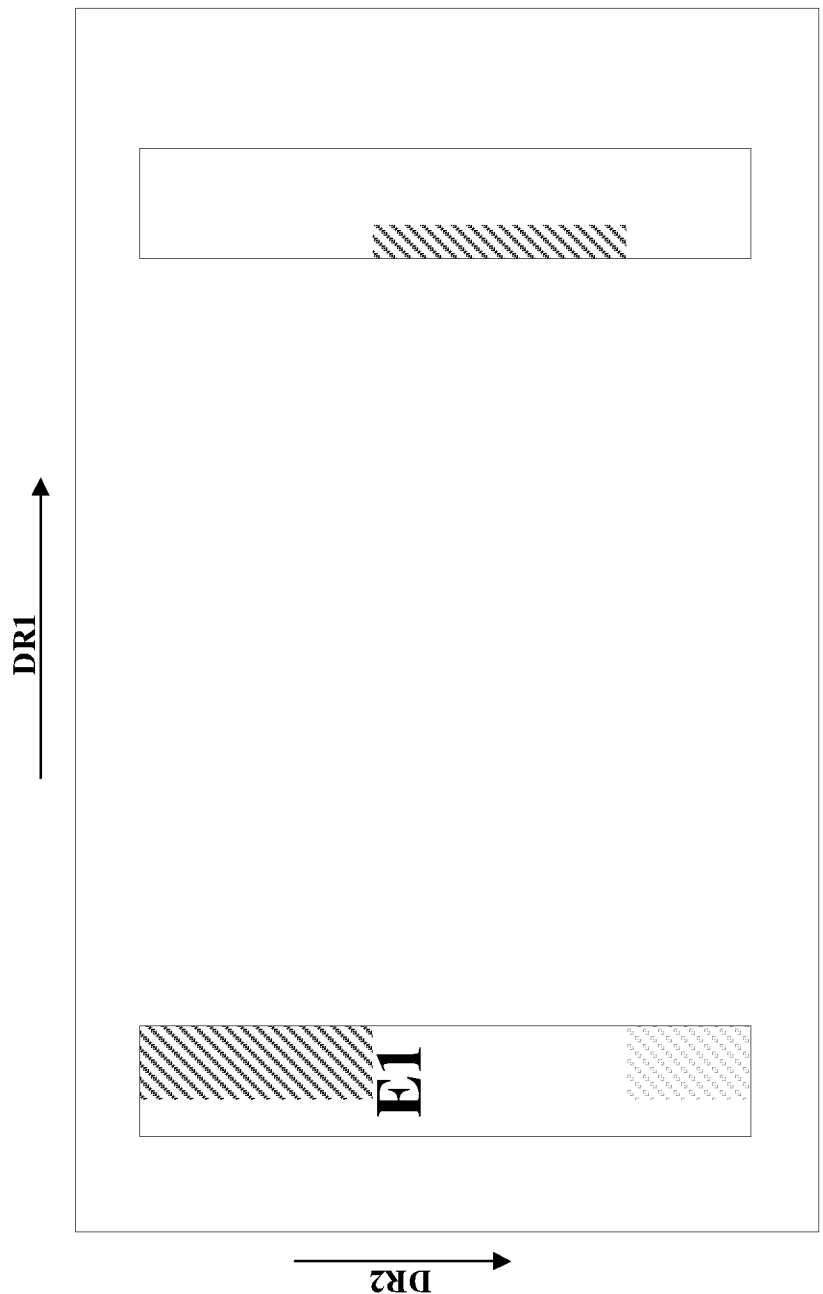
FIG. 2B is a schematic diagram illustrating the structure of a first electrode layer in a haptic device depicted in FIG. 2A.
Figure 2C:
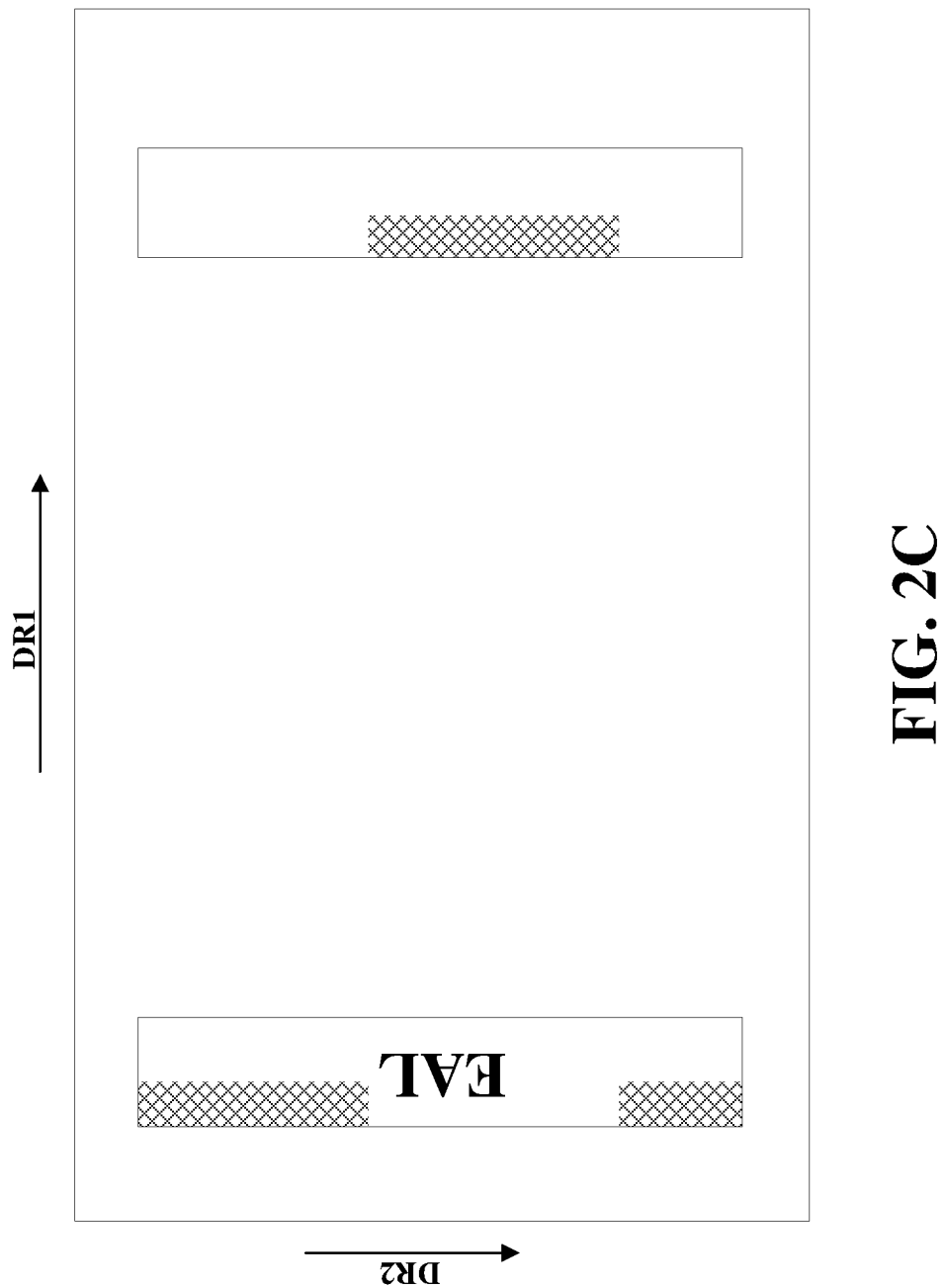
FIG. 2C is a schematic diagram illustrating the structure of an electroactive layer in a haptic device depicted in FIG. 2A.
Figure 2D:
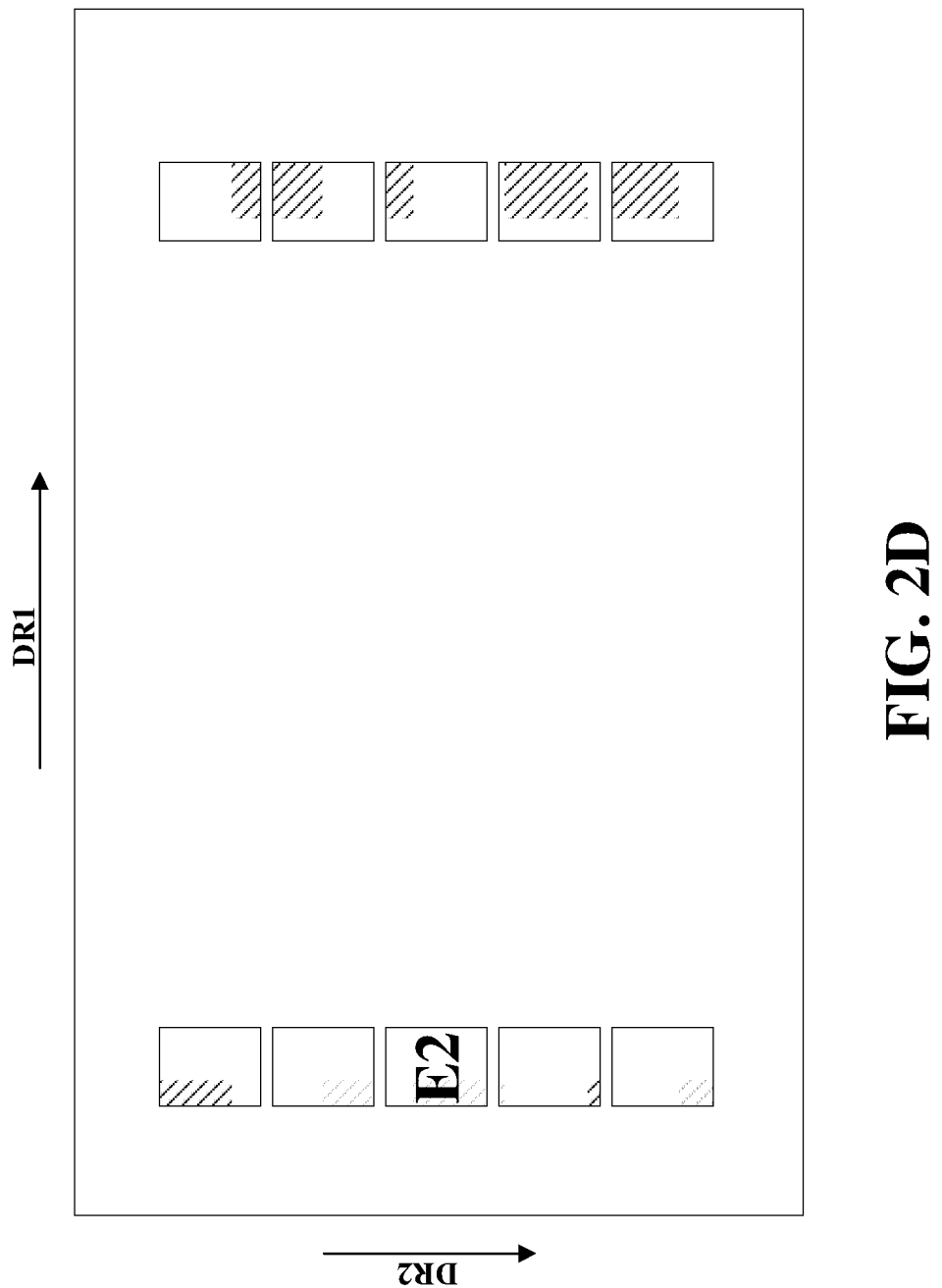
FIG. 2D is a schematic diagram illustrating the structure of a second electrode layer in a haptic device depicted in FIG. 2A.

FIG. 2A is a schematic diagram illustrating the structure of a haptic device in some embodiments according to the present disclosure. Referring to FIG. 2A, the haptic device in some embodiments includes a plurality of units U arranged along a first direction DR1. FIG. 2B is a schematic diagram illustrating the structure of a first electrode layer in a haptic device depicted in FIG. 2A. FIG. 2C is a schematic diagram illustrating the structure of an electroactive layer in a haptic device depicted in FIG. 2A. FIG. 2D is a schematic diagram illustrating the structure of a second electrode layer in a haptic device depicted in FIG. 2A. Referring to FIG. 2A to FIG. 2D, in some embodiments, a respective unit of the plurality of units U includes a first electrode layer E1, an electroactive layer EAL on the first electrode layer E1, and a second electrode layer E2 on a side of the electroactive layer EAL away from the first electrode layer E1. The electroactive layer EAL includes an electroactive material. When a voltage signal (e.g., an alternating current signal) is applied to the substrate (e.g., through the first electrode layer E1 and the second electrode layer E2), structural vibration is formed on a surface of the substrate, particularly when the alternating current signal having a resonant frequency is provided. When a finger is placed on the surface of the substrate, surface tactile friction control can be achieved. The amplitude of the vibration is positively correlated to the amplitude of the voltage signal provided.

As used herein the term "electroactive material" refers to a material that reversibly changes one or more characteristic body dimension by an amount depending on an applied electrical voltage. As used herein, the term "electroactive layer" refers to a layer in the present substrate that includes an electroactive material, and is capable of reversibly changing one or more characteristic body dimension by an amount depending on an applied electrical voltage. Optionally, the electroactive material is an electrostrictive material. Stress and strain response of the electrostrictive material to an electric field is proportional to the square of the electric field. Optionally, the electroactive material is a piezoelectric material. Stress and strain response of the piezoelectric material to an electric field is proportional to the electric field.

Any appropriate electrostrictive material may be used for making the electroactive layer, e.g., electrostrictive ceramics, electrostrictive polymers, electrostrictive valves, etc. Examples of appropriate electrostrictive materials include, but are not limited to, a polyurethane containing material (e.g., a doped polyurethane material), polyvinylidene fluoride, lead magnesium niobate, lead magnesium niobate-lead titanate, lanthanum doped lead zirconate titanate, barium doped lead zirconate titanate, and various substitutes and derivatives thereof (e.g., doped with one or more dopant).

Any appropriate piezoelectric material may be used for making the electroactive layer. Examples of appropriate piezoelectric materials include, but are not limited to, lead zirconium titanate, berlinite, zinc oxide, barium titanate, lead titanate, and various substitutes and derivatives thereof (e.g., doped with one or more dopant).

Figure 3:
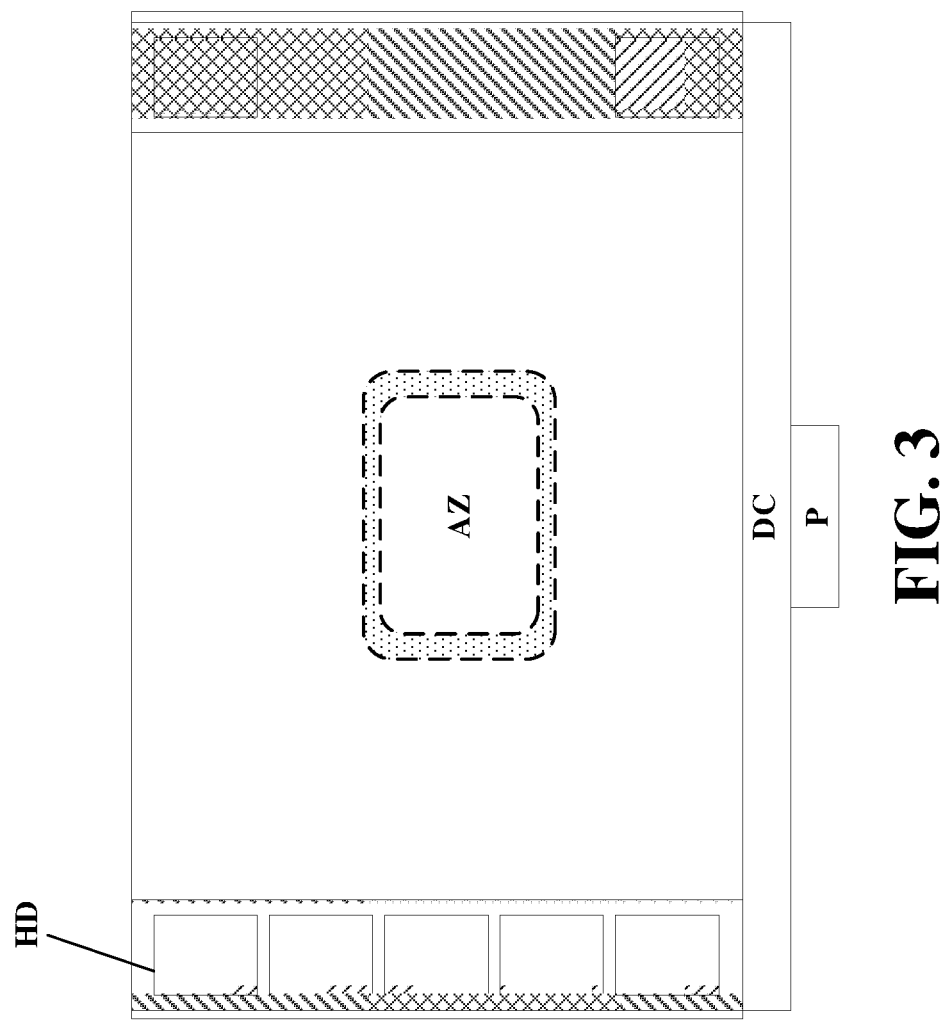
FIG. 3 illustrates a virtual object in some embodiments according to the present disclosure.

As used herein, the term "virtual object" refers to a computer-implemented representation of a physical object. For example, a virtual object may be an object that functionally represents (e.g., by touch control) a real device (e.g., a physical key in a physical keyboard) for input or output purposes. In another example, a virtual object may be a graphic object (e.g., a two-dimensional image, a holographic image, or a three-dimensional image) that visually represents a real device. In another example, a virtual object may be an object that functionally and visually represents a real device. The virtual object may be activatable or non-activatable. FIG. 3 illustrates a virtual object in some embodiments according to the present disclosure. Referring to FIG. 3, the virtual object in some embodiments has an activatable zone AZ. The activatable zone AZ is in a region of the virtual object associated with one or more messages or commands that can be activated by a user interaction (e.g., a touch).

Figure 2E:
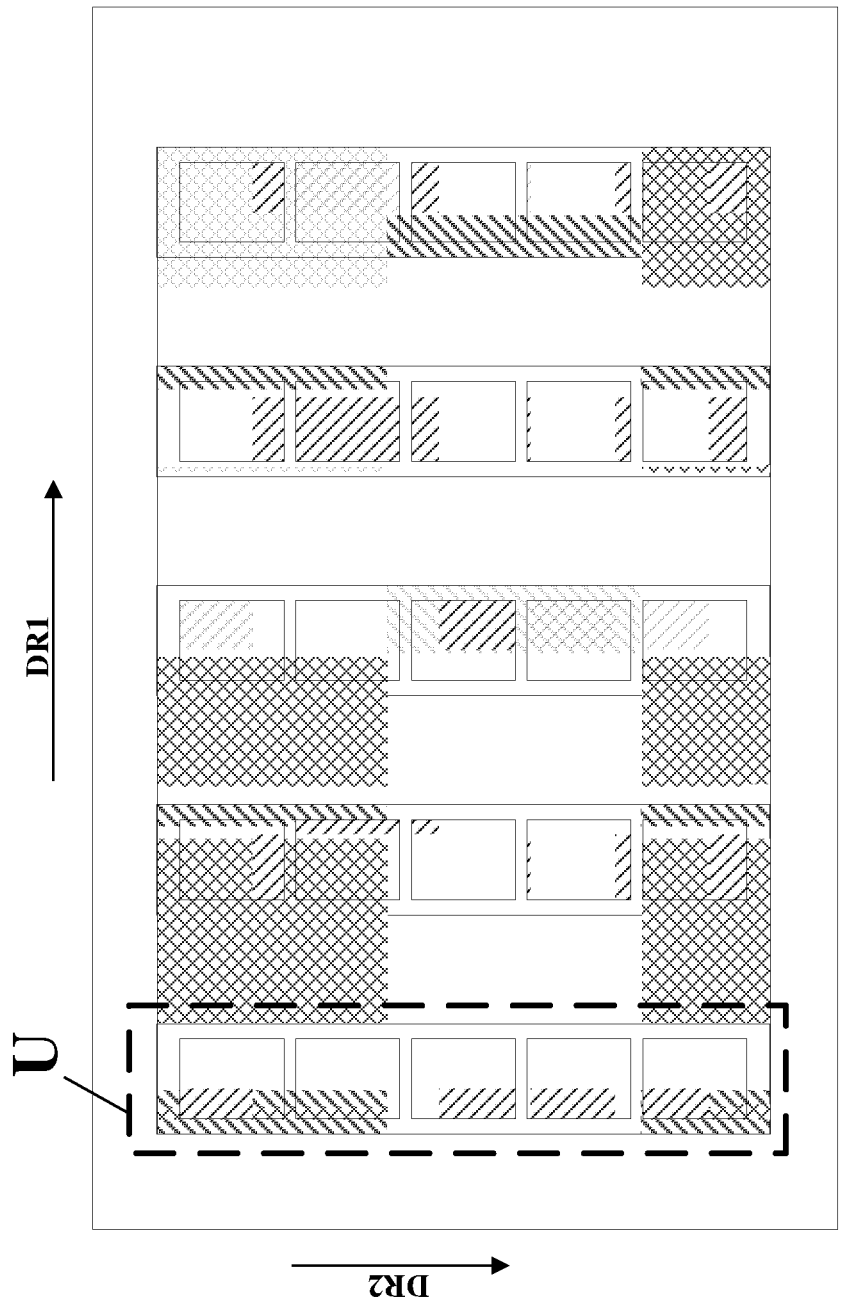
FIG. 2E is a schematic diagram illustrating the structure of a haptic device in some embodiments according to the present disclosure.
Figure 2G:
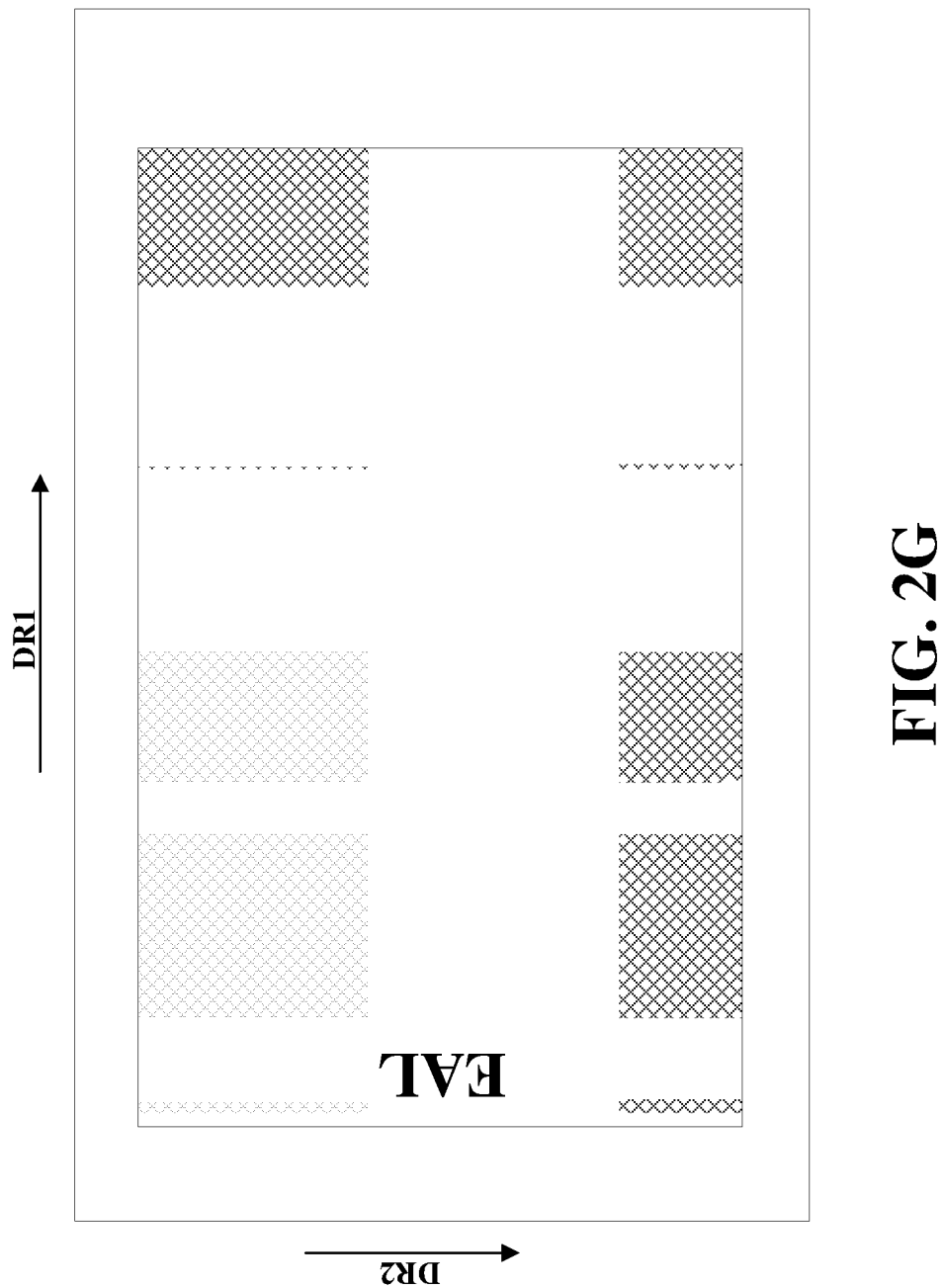
FIG. 2G is a schematic diagram illustrating the structure of an electroactive layer in a haptic device depicted in FIG. 2E.
Figure 2H:
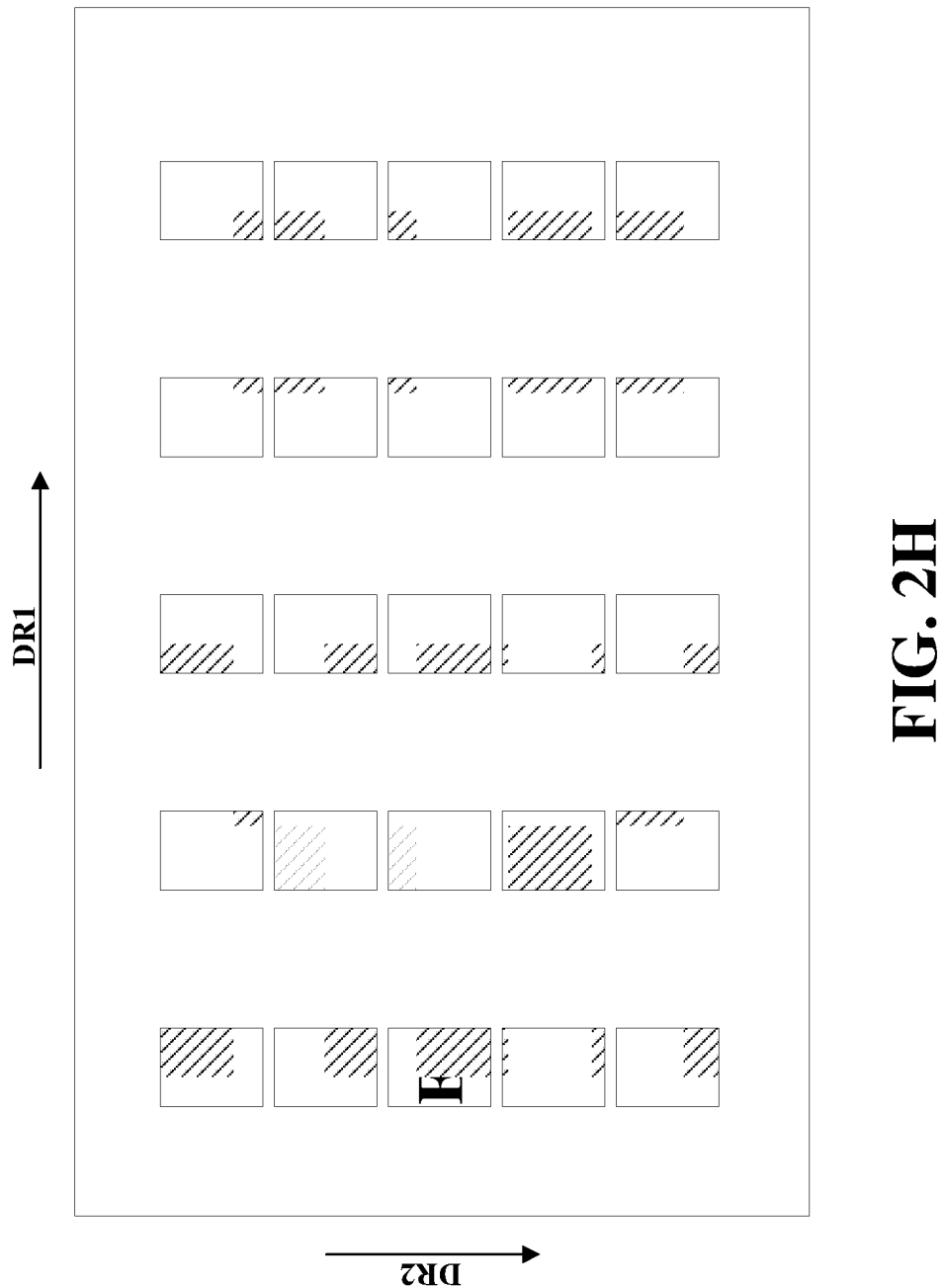
FIG. 2H is a schematic diagram illustrating the structure of a second electrode layer in a haptic device depicted in FIG. 2E.

FIG. 2E is a schematic diagram illustrating the structure of a haptic device in some embodiments according to the present disclosure. FIG. 2F is a schematic diagram illustrating the structure of a first electrode layer in a haptic device depicted in FIG. 2E. FIG. 2G is a schematic diagram illustrating the structure of an electroactive layer in a haptic device depicted in FIG. 2E. FIG. 2H is a schematic diagram illustrating the structure of a second electrode layer in a haptic device depicted in FIG. 2E. Referring to FIG. 2E to FIG. 2H, in some embodiments, the electroactive layer EAL is a continuous layer extending throughout the plurality of units U.

Figure 2I:
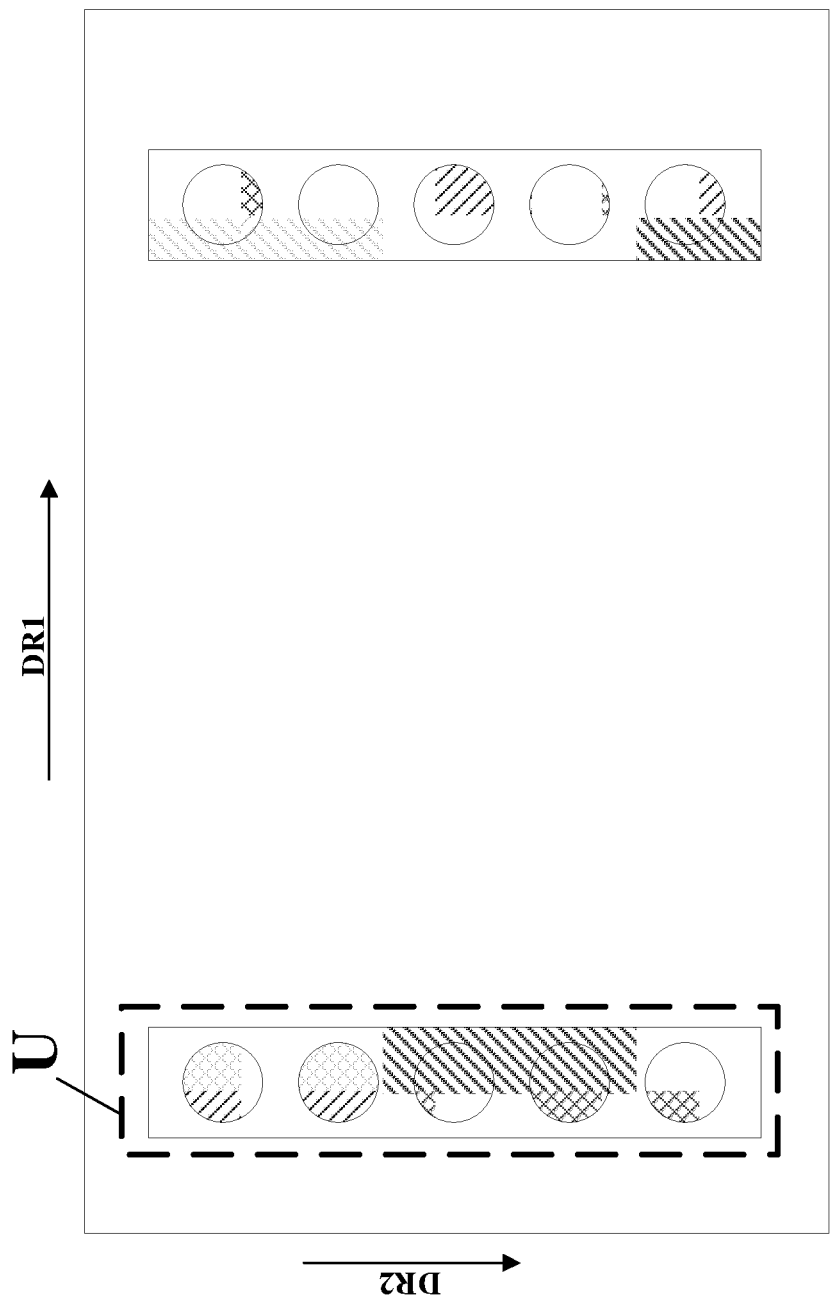
FIG. 2I is a schematic diagram illustrating the structure of a haptic device in some embodiments according to the present disclosure.
Figure 2J:
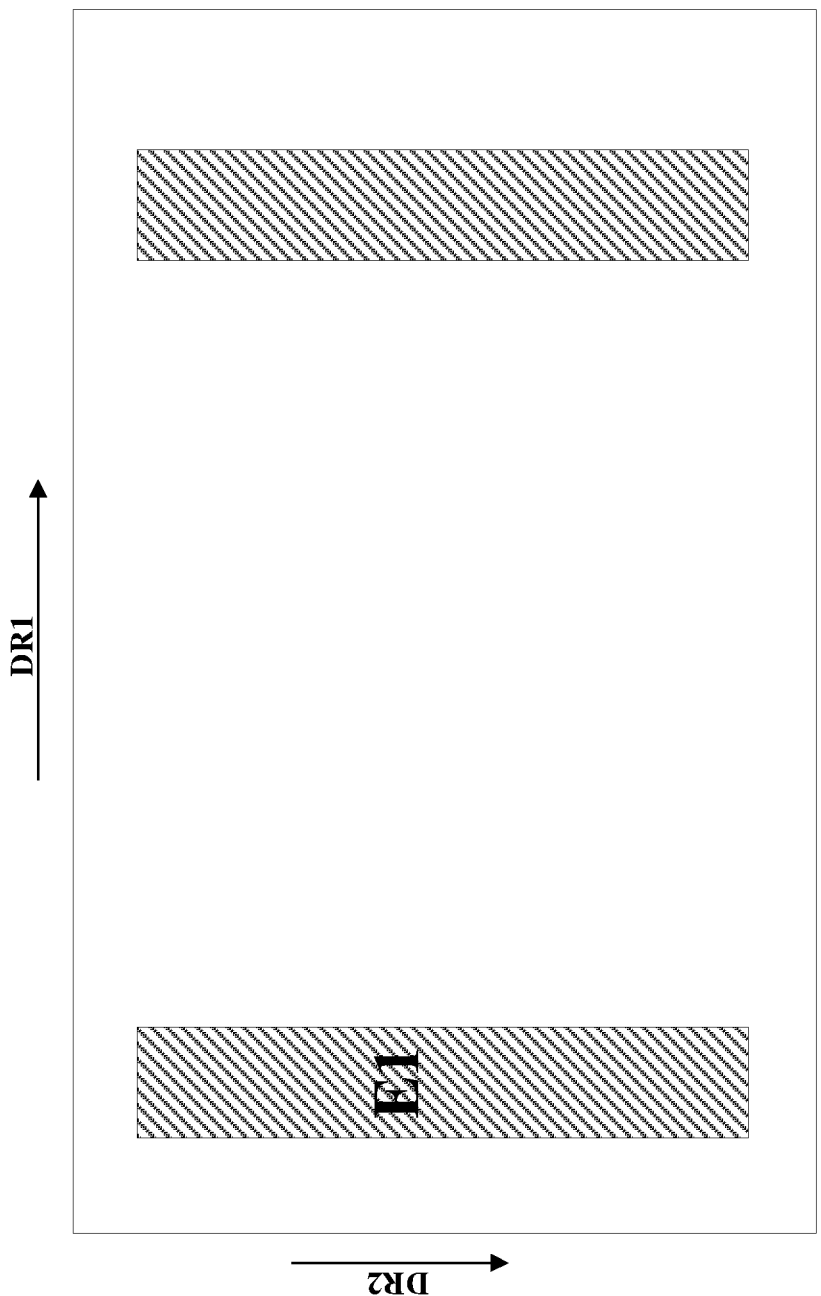
FIG. 2J is a schematic diagram illustrating the structure of a first electrode layer in a haptic device depicted in FIG. 2I.
Figure 2K:
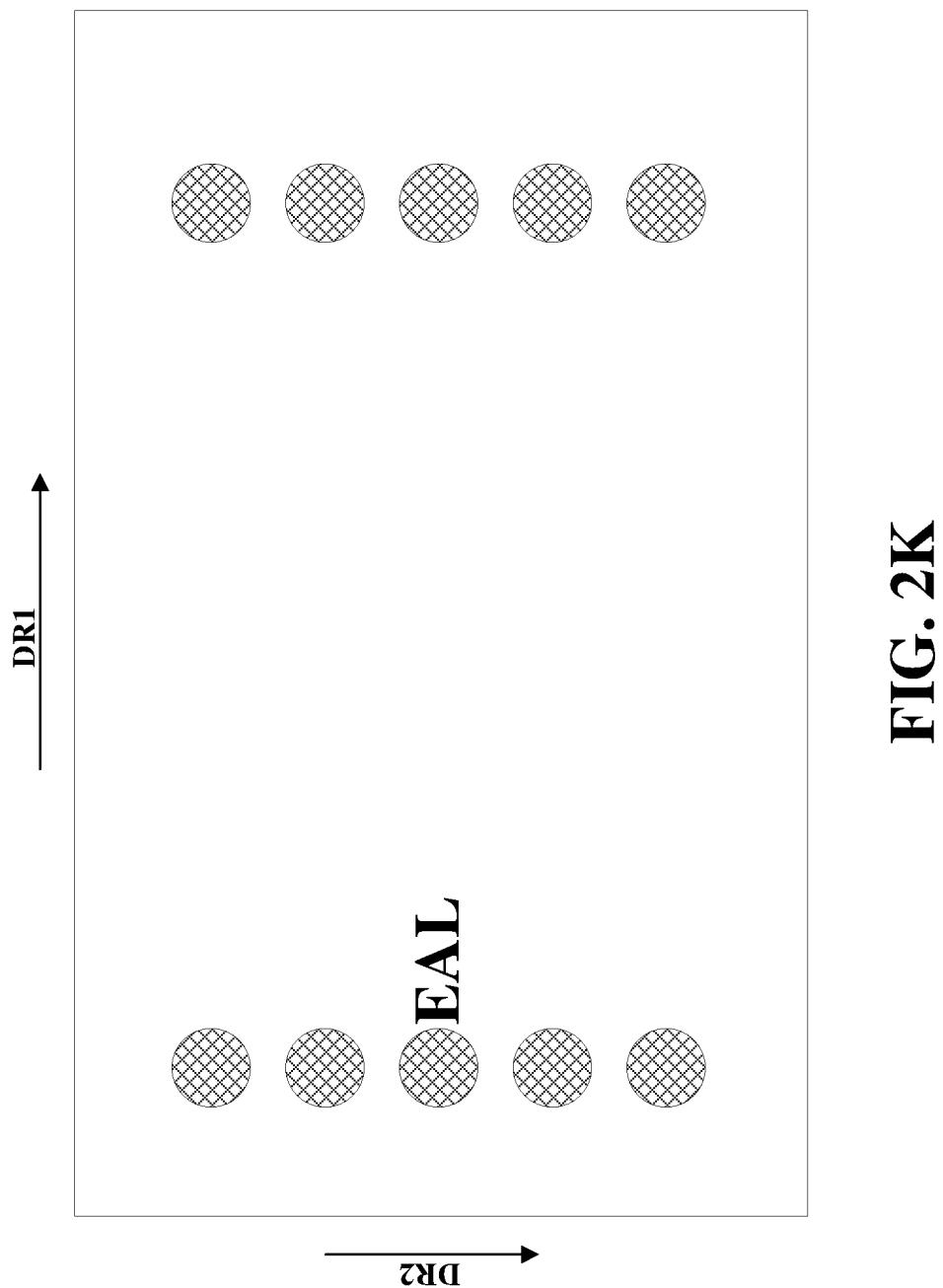
FIG. 2K is a schematic diagram illustrating the structure of an electroactive layer in a haptic device depicted in FIG. 2I.

FIG. 2I is a schematic diagram illustrating the structure of a haptic device in some embodiments according to the present disclosure. FIG. 2J is a schematic diagram illustrating the structure of a first electrode layer in a haptic device depicted in FIG. 2I. FIG. 2K is a schematic diagram illustrating the structure of an electroactive layer in a haptic device depicted in FIG. 2I. FIG. 2L is a schematic diagram illustrating the structure of a second electrode layer in a haptic device depicted in FIG. 2I. Referring to FIG. 2I to FIG. FIG. 2L, in some embodiments, the electroactive layer EAL includes a plurality of blocks. The plurality of blocks may have various appropriate shapes such as a circular shape (as depicted in FIG. 2K), a square shape, a rectangular shape, or a polygonal shape.

As discussed above, the haptic device is configured to produce a haptic action accompanying an individual touch action. In the context of the present disclosure, the term individual touch action refers to a touch action associated with an individual activation of a virtual object, for example, an individual touch on the virtual object to activate an individual command, or an individual touch on the virtual object to activate an individual message.

Typically, in related electronic apparatuses, the haptic action accompanying an individual touch action includes a continuous haptic action during which the driving voltage or driving current or driving frequency of the signal provided to the haptic device remains the same throughout an entirety of the haptic action accompanying the individual touch action. In one example, the frequency and/or the amplitude of the driving signal provided to the haptic device remains the same throughout an entirety of the haptic action accompanying the individual touch action. In another example, a vibration pattern produced by the haptic device has a same frequency and/or substantially the same amplitude throughout an entirety of the haptic action accompanying the individual touch action. Due to the squeeze film effect between the finger and the surface of the electronic apparatus, heat is produced at the touch contact interface due to the friction between the finger and the surface of the electronic apparatus, severely affecting user experience.

The inventors of the present disclosure discover that, by driving the haptic device to produce a plurality of sub-actions cumulatively achieving at least a part of the haptic action accompanying the individual touch action, the overheating issue in related electronic apparatuses may be, surprisingly and unexpected, obviated. The present electronic apparatus and operating method allow real-time adjustment of parameters related to the driving signal, effectively achieving a lower temperature at the touch contact interface and a lower power consumption. Moreover, the present electronic apparatus and operating method have enhanced flexibility in allowing real-time adjustment of the driving signal tailored to user habits, further improving user experience. The present electronic apparatus and operating method do not require additional heat dissipation structures, maintaining a compact size of the electronic apparatus.

Figure 4A:
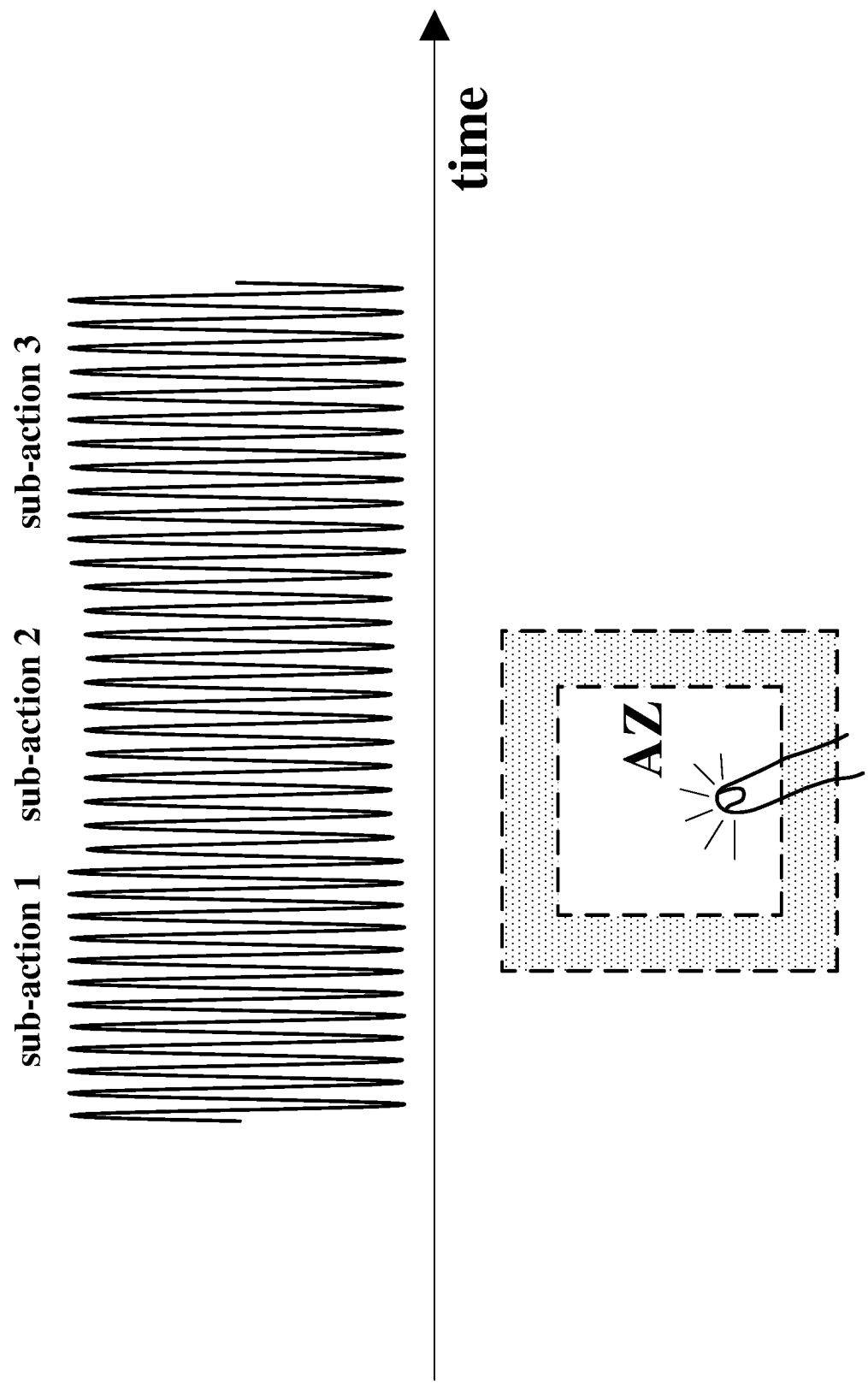
FIG. 4A illustrates a plurality of sub-actions cumulatively achieving a haptic action accompanying an individual touch action in some embodiments according to the present disclosure.
Figure 4B:
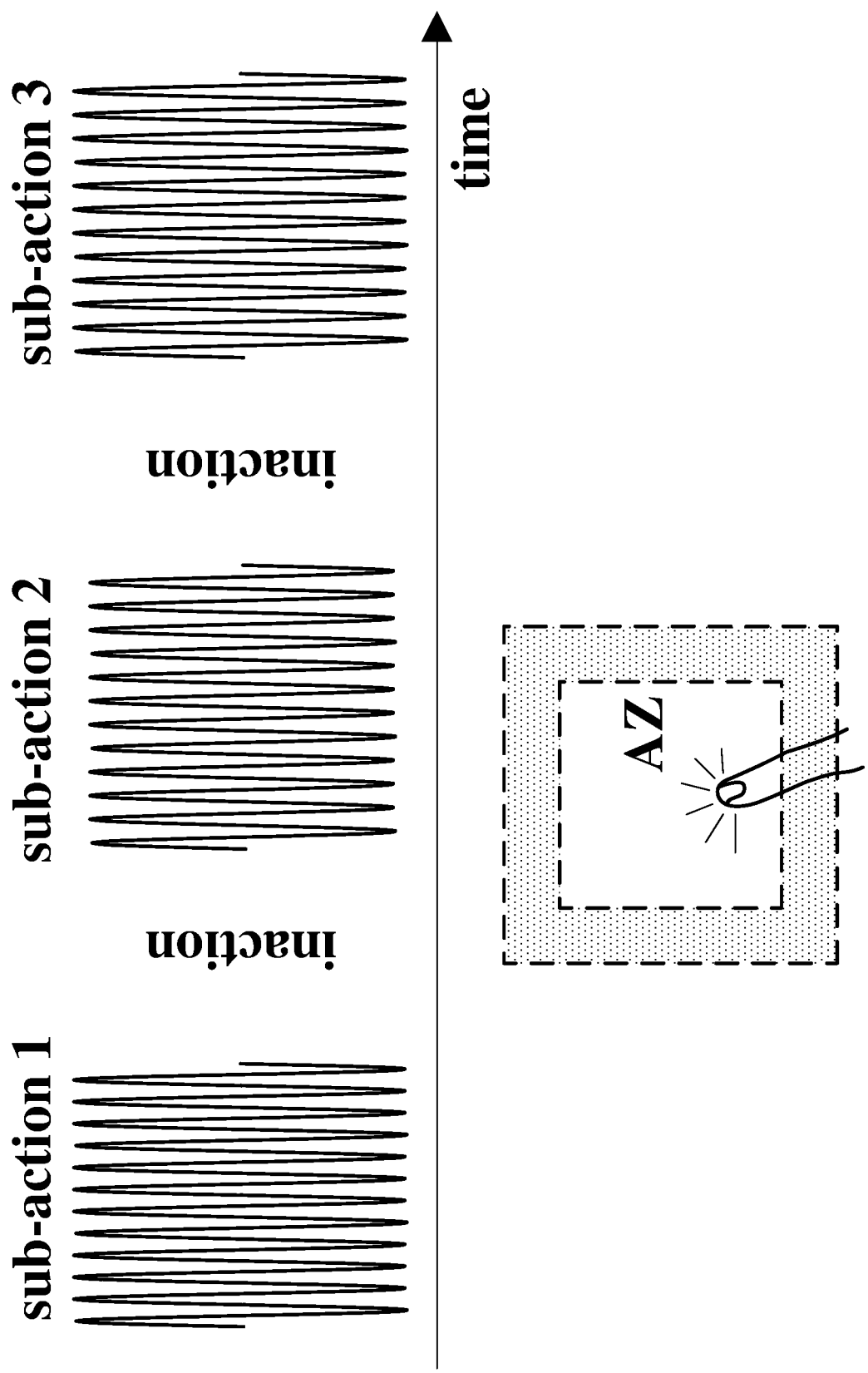
FIG. 4B illustrates a plurality of sub-actions cumulatively achieving a haptic action accompanying an individual touch action in some embodiments according to the present disclosure.

FIG. 4A illustrates a plurality of sub-actions cumulatively achieving a haptic action accompanying an individual touch action in some embodiments according to the present disclosure. FIG. 4B illustrates a plurality of sub-actions cumulatively achieving a haptic action accompanying an individual touch action in some embodiments according to the present disclosure. Referring to FIG. 4A and FIG. 4B, the haptic device in some embodiments is configured to produce a plurality of sub-actions (e.g., sub-action 1, sub-action 2, and sub-action 3), when the processor determines that the touch is of a first mode. In one example, the first mode is a touch mode in which the touch (e.g., a finger) is activating a virtual object in an activatable zone AZ. In another example, the first mode is a touch mode in which the touch is crossing over a boundary zone of the virtual object, and a haptic action is produced to simulate a boundary for the virtual object.

Referring to FIG. 4A and FIG. 4B, in some embodiments, at least two sub-actions of the plurality of sub-actions are different from each other in at least one parameter. Examples of parameters include a driving voltage of a signal provided to the haptic device for a respective sub-action, a driving duration of a signal for the respective sub-action, a driving frequency of a signal provided to the haptic device for a respective sub-action, or a combination thereof. Optionally, at least two consecutive sub-actions of the plurality of sub-actions are different from each other in at least one parameters. The plurality of sub-actions are time sequentially produced, one after another, for example, locally in the activatable zone AZ or globally throughout the surface of the electronic apparatus. In the examples depicted in FIG. 4A and FIG. 4B, sub-action 1 has a shorter driving duration than sub-action 2 and sub-action 3; sub-action 2 has a lower driving voltage than sub-action 1 and sub-action 3. Sub-action 1 and sub-action 3 are different from each other in a single parameter (driving duration); sub-action 2 and sub-action 3 are different from each other in a single parameter (driving voltage); and sub-action 1 and sub-action 2 are different from each other in two parameters (driving duration and driving voltage). As used herein, driving voltages of two sub-actions being different from each other refers to that at least the amplitudes of driving voltages of two sub-actions are different from each other.

In some embodiments, two sub-actions of the plurality of sub-actions are different from each other only in one parameter. Optionally, two sub-actions of the plurality of sub-actions are different from each other only in the driving duration. Optionally, two sub-actions of the plurality of sub-actions are different from each other only in the driving voltage.

In some embodiments, at least two sub-actions of the plurality of sub-actions are different from each other in at least one parameter, while at least two other sub-actions of the plurality of sub-actions are the same in the at least one parameter. In one example, sub-action 1 has a lower driving voltage than sub-action 2, but has a same driving voltage as sub-action 3.

In some embodiments, the haptic action is a continuous action, and haptic effect is a continuous one without interruption. Referring to FIG. 4A, the plurality of sub-actions are consecutive sub-actions without interruption.

In some embodiments, the haptic action further includes at least one inaction. A respective inaction is between two consecutive sub-actions. Driving signal for the haptic action accompanying the individual touch action is temporarily discontinued during the at least one inaction. Referring to FIG. 4B, the haptic action includes a plurality of sub-actions and a plurality of inactions alternately produced; a respective inaction is between two consecutive sub-actions; and a respective sub-action is between two consecutive inactions.

In some embodiments, the plurality of sub-actions are characterized by a plurality of first parameters. A respective first parameter includes a first base adjusted by a first randomized factor. Optionally, the plurality of first parameters are a plurality of driving voltages for the plurality of sub-actions, respectively; and a value of a respective driving voltage is an addition of a base voltage value and a randomized voltage value. Optionally, the plurality of first parameters are a plurality of driving durations for the plurality of sub-actions, respectively; and a value of a respective driving duration is an addition of a base duration value and a randomized duration value.

In some embodiments, the at least one parameter is a driving voltage of a signal provided to the haptic device for a respective sub-action. Optionally, at least two sub-actions of the plurality of sub-actions are produced using different driving voltages. Optionally, at least two consecutive sub-actions of the plurality of sub-actions are produced using different driving voltages.

In some embodiments, the plurality of sub-actions are produced using a plurality of driving durations, respectively. In one example, the tactile time resolution of a finger is approximately 50 milliseconds. In one specific example, an individual touch action typically lasts 0.5 second. In another specific example, each of the plurality of driving durations has a value of T/n, wherein T stands for the duration of the individual touch action, and n may be a positive integer. In another example, T=0.5 second, n=10, and each of the plurality of driving durations has a value of 50 milliseconds. A respective driving voltage corresponding to each of the plurality of driving durations may be adjusted to have a value equal to (B1+r1), wherein B1 stands for a base voltage value, and r1 stands for a randomized voltage value. In one example, the base voltage value is 70 V, and r1=random (m1), wherein m1 is a positive integer. In another example, m1=10. In another example, in a first driving duration, r1=5, and the first driving voltage=70+5=75 V. In another example, in a second driving duration, r1=8, and the second driving voltage=70+8=78 V. The driving voltages for the plurality of sub-actions accompanying an individual touch action are not uniformly applied. The plurality of sub-actions configured in this manner result in a lower temperature at the touch contact interface and a lower power consumption, while still maintaining a satisfactory haptic effect.

In some embodiments, the at least one parameter is a driving duration for the respective sub-action, or a combination thereof. Optionally, at least two sub-actions of the plurality of sub-actions are produced using different driving durations. Optionally, at least two consecutive sub-actions of the plurality of sub-actions are produced using different driving durations.

In some embodiments, the plurality of sub-actions are produced using a plurality of driving durations, respectively. In one example, a respective driving duration may be adjusted to have a value equal to (B2+r2), wherein B2 stands for a base duration value, and r2 stands for a randomized duration value. In another example, the base duration value is 40 milliseconds, and r2=random (m2), wherein m2 is a positive integer. In another example, m2=10. In another example, r2=5, and the first driving duration=40+5=45 milliseconds. In another example, r2=8, and the second driving duration=40+8=48 milliseconds. The driving duration for the plurality of sub-actions accompanying an individual touch action are not uniformly applied. The plurality of sub-actions configured in this manner result in a lower temperature at the touch contact interface and a lower power consumption, while still maintaining a satisfactory haptic effect.

In some embodiments, the plurality of sub-actions are characterized by a plurality of first parameters and a plurality of second parameters. Optionally, a respective first parameter includes a first base adjusted by a first randomized factor. Optionally, a respective second parameter includes a second base adjusted by a second randomized factor.

In some embodiments, the plurality of first parameters are a plurality of driving voltages for the plurality of sub-actions, respectively; and the plurality of second parameters are a plurality of driving durations for the plurality of sub-actions, respectively. Optionally, a value of a respective driving voltage is an addition of a base voltage value and a randomized voltage value; and a value of a respective driving duration is an addition of a base duration value and a randomized duration value.

In some embodiments, the plurality of sub-actions are produced using a plurality of driving durations, respectively; and a plurality of driving voltages corresponding to the plurality of driving durations. A respective driving voltage corresponding to each of the plurality of driving durations may be adjusted to have a value equal to (B1+r1), wherein B1 stands for a base voltage value, and r1 stands for a randomized voltage value. A respective driving duration may be adjusted to have a value equal to (B2+r2), wherein B2 stands for a base duration value, and r2 stands for a randomized duration value. In one example, the base voltage value is 70 V, and the base duration value is 40 milliseconds; wherein r1=random (m1), m1 is a positive integer; and r2=random (m2), m2 is a positive integer. In another example, m1=10, and m2=10. In another example, in a first driving duration, r1=5, r2=5, the first driving voltage=70+5=75 V, and the first driving duration=40+5=45 milliseconds. In another example, in a second driving duration, r1=8, r2=8, the second driving voltage=70+8=78 V, and the second driving duration=40+8=48 milliseconds.

In some embodiments, referring to FIG. 4A, the haptic action is a continuous action, and the plurality of sub-actions are consecutive sub-actions without interruption. In some embodiments, the plurality of sub-actions are characterized by a plurality of driving voltages and/or a plurality of driving frequencies for the plurality of sub-actions, respectively. In some embodiments, driving voltages for any two consecutive sub-actions of the plurality of sub-actions are different from each other. Optionally, the plurality of driving voltages are different from each other. Differences between the plurality of driving voltages are within a first threshold range.

In some embodiments, driving frequencies for any two consecutive sub-actions of the plurality of sub-actions are different from each other. Optionally, the plurality of driving frequencies are different from each other. Differences between the plurality of driving frequencies are within a third threshold range.

In some embodiments, driving frequencies and driving voltages for any two consecutive sub-actions of the plurality of sub-actions are different from each other. Optionally, the plurality of driving voltages are different from each other; and the plurality of driving frequencies are different from each other.

In some embodiments, at least two driving durations of a plurality of driving durations for the plurality of sub-actions are different from each other. Optionally, the plurality of driving durations for the plurality of sub-actions are different from each other.

In some embodiments, a plurality of driving durations for the plurality of sub-actions are the same.

In some embodiments, a value of a respective driving voltage of the plurality of driving voltages is an addition of a base voltage value and a randomized voltage value. Optionally, base voltage values of the plurality of driving voltages are the same. Optionally, differences between randomized voltage values of the plurality of driving voltages are within the first threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value.

In some embodiments, a value of a respective driving frequency of the plurality of driving frequencies is an addition of a base frequency value and a randomized frequency value. Optionally, base frequency values of the plurality of driving frequencies are the same. Optionally, differences between randomized frequency values of the plurality of driving frequencies are within a third threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base frequency value.

In some embodiments, referring to FIG. 4B, the haptic action further comprises at least one inaction. A respective inaction of the at least one inaction is between two consecutive sub-actions. Driving signal for the haptic action accompanying the individual touch action is temporarily discontinued during the at least one inaction.

In some embodiments, the plurality of sub-actions are characterized by a plurality of driving voltages for the plurality of sub-actions, respectively. In some embodiments, driving voltages for at least two sub-actions of the plurality of sub-actions are different from each other. Optionally, the plurality of driving voltages are different from each other. Differences between the plurality of driving voltages are within a first threshold range.

In some embodiments, the plurality of sub-actions are characterized by a plurality of driving frequencies for the plurality of sub-actions, respectively. In some embodiments, driving frequencies for at least two sub-actions of the plurality of sub-actions are different from each other. Optionally, the plurality of driving frequencies are different from each other. Differences between the plurality of driving frequencies are within a third threshold range.

In some embodiments, a value of a respective driving voltage of the plurality of driving voltages is an addition of a base voltage value and a randomized voltage value. Optionally, base voltage values of the plurality of driving voltages are the same. Optionally, differences between randomized voltage values of the plurality of driving voltages are within the first threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value.

In some embodiments, a value of a respective driving frequency of the plurality of driving frequencies is an addition of a base frequency value and a randomized frequency value. Optionally, base frequency values of the plurality of driving frequencies are the same. Optionally, differences between randomized frequency values of the plurality of driving frequencies are within a third threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base voltage value.

In some embodiments, at least two driving durations of a plurality of driving durations for the plurality of sub-actions are different from each other. Optionally, the plurality of driving durations for the plurality of sub-actions are different from each other. Accordingly, the plurality of sub-actions are characterized by a plurality of driving voltages and/or a plurality of driving frequencies for the plurality of sub-actions, and by a plurality of driving durations for the plurality of sub-actions, respectively. In some embodiments, the plurality of driving voltages are different from each other, and the plurality of driving durations are different from each other. Differences between the plurality of driving voltages are within a first threshold range, and differences between the plurality of driving durations are within a second threshold range.

In some embodiments, the plurality of driving frequencies are different from each other, and the plurality of driving durations are different from each other. Differences between the plurality of driving frequencies are within a third threshold range, and differences between the plurality of driving durations are within a second threshold range.

In some embodiments, the plurality of driving voltages are different from each other, the plurality of driving frequencies are different from each other, and the plurality of driving durations are different from each other. Differences between the plurality of driving voltages are within a first threshold range, differences between the plurality of driving frequencies are within a third threshold range, and differences between the plurality of driving durations are within a second threshold range.

In some embodiments, a value of a respective driving voltage of the plurality of driving voltages is an addition of a base voltage value and a randomized voltage value; and a value of a respective driving duration of the plurality of driving durations is an addition of a base duration value and a randomized duration value. Base voltage values of the plurality of driving voltages are the same; and base duration values of the plurality of driving durations are the same. Optionally, differences between randomized voltage values of the plurality of driving voltages are within the first threshold range; and differences between randomized duration values of the plurality of driving durations are within the second threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value. In another example, the differences between randomized duration values of the plurality of driving duration are within 50% (e.g., within 45%, within 40%, within 35%, within 30%, within 25%, within 20%, within 15%, within 10%, within 5%, or within 1%) of the base duration value.

In some embodiments, a value of a respective driving frequency of the plurality of driving frequencies is an addition of a base frequency value and a randomized frequency value; and a value of a respective driving duration of the plurality of driving durations is an addition of a base duration value and a randomized duration value. Base frequency values of the plurality of driving frequencies are the same; and base duration values of the plurality of driving durations are the same. Optionally, differences between randomized frequency values of the plurality of driving frequencies are within a third threshold range; and differences between randomized duration values of the plurality of driving durations are within the second threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base frequency value. In another example, the differences between randomized duration values of the plurality of driving duration are within 50% (e.g., within 45%, within 40%, within 35%, within 30%, within 25%, within 20%, within 15%, within 10%, within 5%, or within 1%) of the base duration value.

In some embodiments, variations in the plurality of driving durations are at least partially correlated to a driving frequency of the driving signal. In one example, when the driving frequency is equal to or less than 1 KHz, a maximum difference between the plurality of driving durations is set to be within 5% of a value of the driving frequency. For example, when the driving frequency is 100 Hz, the maximum difference is set to be within 5 cycles of the driving signal. In another example, when the driving frequency is 800 Hz, the maximum difference is set to be within 40 cycles of the driving signal. In another example, when driving frequency is less than 10 Hz, a minimum difference between the plurality of driving durations is set to be one cycle of the driving signal. In another example, when the driving frequency is greater than 1 KHz, a maximum difference between the plurality of driving durations is set to be within 10% of a value of the driving frequency. For example, when the driving frequency is 2 KHz, the maximum difference is set to be within 200 cycles of the driving signal.

In some embodiments, a plurality of driving durations for the plurality of sub-actions are the same.

In some embodiments, the plurality of sub-actions are characterized by a plurality of driving durations for the plurality of sub-actions, respectively. In some embodiments, driving durations for at least two sub-actions of the plurality of sub-actions are different from each other. Optionally, the plurality of driving durations are different from each other. Differences between the plurality of driving durations are within a second threshold range.

In some embodiments, a value of a respective driving duration of the plurality of driving durations is an addition of a base duration value and a randomized duration value. Optionally, base duration values of the plurality of driving durations are the same. Optionally, differences between randomized duration values of the plurality of driving durations are within the second threshold range. In one example, the differences between randomized duration values of the plurality of driving durations are within 50% (e.g., within 45%, within 40%, within 35%, within 30%, within 25%, within 20%, within 15%, within 5%, or within 1%) of the base duration value.

In some embodiments, at least two driving voltages of a plurality of driving voltages for the plurality of sub-actions are different from each other. Optionally, the plurality of driving voltages for the plurality of sub-actions are different from each other.

In some embodiments, at least two driving frequencies of a plurality of driving frequencies for the plurality of sub-actions are different from each other. Optionally, the plurality of driving frequencies for the plurality of sub-actions are different from each other.

In some embodiments, at least two driving voltages of a plurality of driving voltages and at least two driving frequencies of a plurality of driving frequencies for the plurality of sub-actions are different from each other. Optionally, the plurality of driving voltages and the plurality of driving frequencies for the plurality of sub-actions are different from each other.

In some embodiments, a plurality of driving voltages for the plurality of sub-actions are the same.

In some embodiments, a plurality of driving frequencies for the plurality of sub-actions are the same.

In some embodiments, a plurality of driving voltages and a plurality of driving frequencies for the plurality of sub-actions are the same.

Driving voltage may have various appropriate waveforms. FIG. 4C illustrates a plurality of sub-actions cumulatively achieving a haptic action accompanying an individual touch action in some embodiments according to the present disclosure. The driving voltage depicted in FIG. 4C has a square wave form.

In one specific example, the first threshold range is within 15% of a maximum value of the plurality of driving voltages.

In another specific example, the third threshold range is within 5% of a maximum frequency of the plurality of driving frequencies, when the maximum frequency is equal to or less than 1 KHz.

In another specific example, the third threshold range is within 10% of a maximum frequency of the plurality of driving frequencies, when the maximum frequency is greater than 1 KHz.

In some embodiments, the processor is configured to determine a touch characteristic of the touch thereby classifying the touch into one of the at least two modes. In one example, the at least two modes includes a first mode and a second mode. In another example, the first mode is a touch mode in which the touch (e.g., a finger) is activating a virtual object in an activatable zone. In another example, the first mode is a touch mode in which the touch is crossing over a boundary zone of the virtual object, and a haptic action is produced to simulate a boundary for the virtual object. In another example, the second mode is a mode in which the touch is not intended to activate a virtual object. For example, the second mode may be a false touch. Optionally, the at least two modes further includes a third mode. In one example, the third mode is a touch mode in which the touch is completely outside the virtual object.

In some embodiments, the processor is configured to determine a touch contact area or a touch duration or a combination thereof, thereby classifying the touch into one of the at least two modes.

In some embodiments, the touch characteristic is a touch duration of the individual touch action. Optionally, the processor is configured to determine whether the touch duration is greater than a threshold duration. Upon determination that the touch duration is greater than the threshold duration, the processor is configured to classify the touch into the first mode. Upon determination that touch duration is equal to or less than the threshold duration, the processor is configured to classify the touch into a second mode.

In some embodiments, the touch characteristic is a touch contact area of the individual touch action. Optionally, the processor is configured to determine whether the touch contact area is greater than a threshold area. Upon determination that the touch contact area is greater than the threshold area, the processor is configured to classify the touch into the first mode. Upon determination that touch contact area is equal to or less than the threshold area, the processor is configured to classify the touch into a second mode.

In some embodiments, the touch characteristics include both a touch contact area and a touch duration. Optionally, the processor is configured to determine whether the touch duration is greater than a threshold duration, and whether the touch contact area is greater than a threshold area. Upon determination that the touch duration is greater than the threshold duration and the touch contact area is greater than the threshold area, the processor is configured to classify the touch into the first mode. Upon determination that touch duration is equal to or less than the threshold duration, the processor is configured to classify the touch into a second mode. Upon determination that touch contact area is equal to or less than the threshold area, the processor is configured to classify the touch into the second mode.

In some embodiments, the haptic device is configured not to produce any haptic action when the processor classifies the touch into the second mode (or any mode other than the first mode). Optionally, the electronic apparatus is configured to provide an error message upon classifying the touch into the second mode. The error message may be an acoustic message or a visual message.

Figure 5:
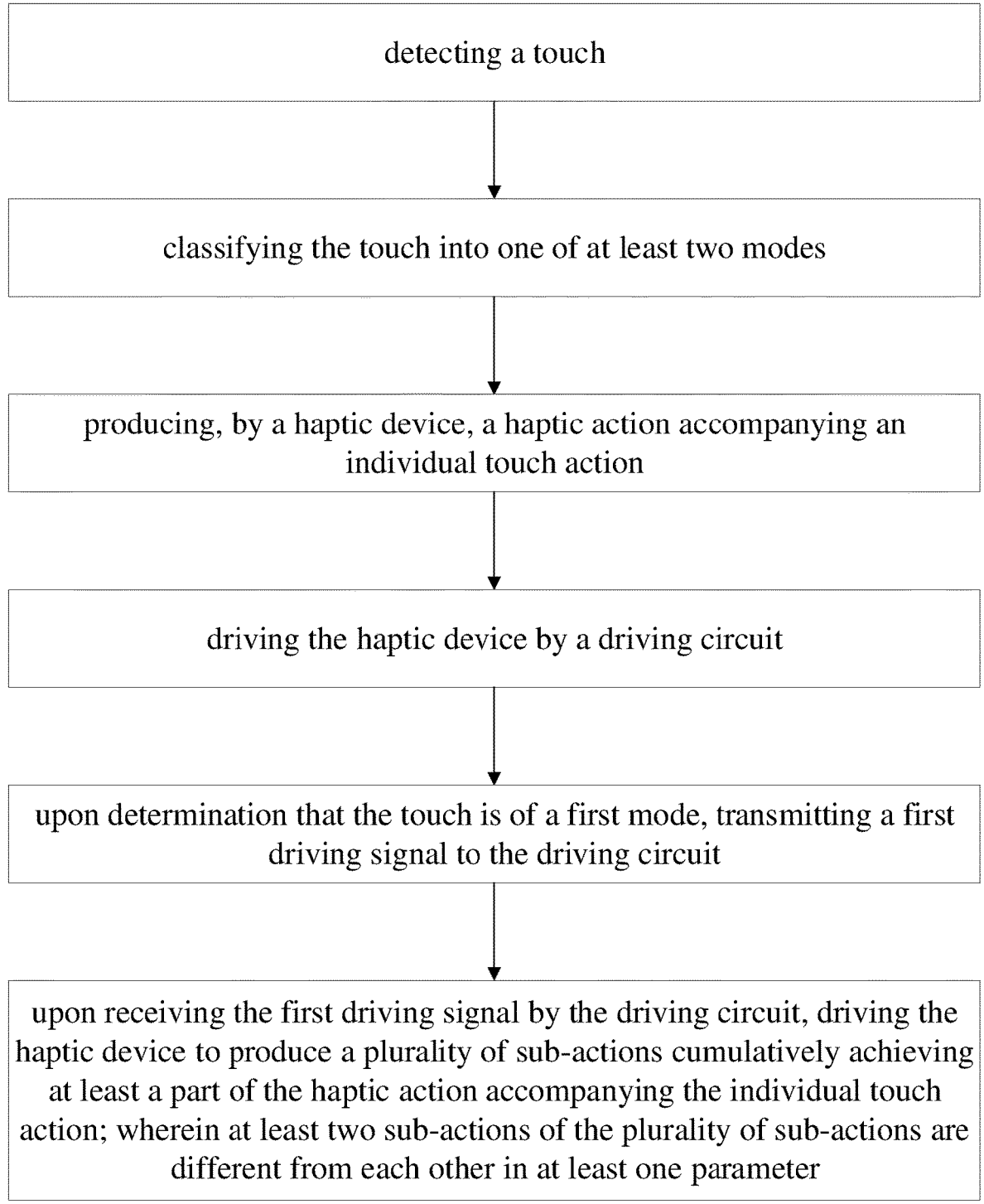
FIG. 5 is a flow chart illustrating a method of operating an electronic apparatus in some embodiments according to the present disclosure.

In another aspect, the present disclosure provides a method of operating an electronic apparatus. FIG. 5 is a flow chart illustrating a method of operating an electronic apparatus in some embodiments according to the present disclosure. Referring to FIG. 5, the method in some embodiments includes detecting a touch; classifying the touch into one of at least two modes; producing, by a haptic device, a haptic action accompanying an individual touch action; driving the haptic device by a driving circuit; upon determination that the touch is of a first mode, transmitting a first driving signal to the driving circuit; and upon receiving the first driving signal by the driving circuit, driving the haptic device to produce a plurality of sub-actions cumulatively achieving at least a part of the haptic action accompanying the individual touch action. Optionally, at least two sub-actions of the plurality of sub-actions are different from each other in at least one parameter. Optionally, at least two consecutive sub-actions of the plurality of sub-actions are different from each other in at least one parameters.

In some embodiments, producing the haptic action accompanying the individual touch action further includes producing at least one inaction during which driving signal for the haptic action accompanying the individual touch action is temporarily discontinued. A respective inaction is between two consecutive sub-actions.

In some embodiments, the at least one parameter is a driving voltage of a signal provided to the haptic device for a respective sub-action or a driving duration for the respective sub-action, or a combination thereof. Optionally, the plurality of sub-actions are characterized by a plurality of first parameters. A respective first parameter includes a first base adjusted by a first randomized factor.

In some embodiments, the plurality of first parameters are a plurality of driving voltages for the plurality of sub-actions, respectively. The method further includes determining a value of a respective driving voltage. Optionally, the value of the respective driving voltage is an addition of a base voltage value and a randomized voltage value.

In some embodiments, the plurality of first parameters are a plurality of driving durations for the plurality of sub-actions, respectively. The method further includes determining a value of a respective driving duration. Optionally, the value of the respective driving duration is an addition of a base duration value and a randomized duration value.

In some embodiments, the plurality of sub-actions are characterized by a plurality of first parameters and a plurality of second parameters. A respective first parameter comprises a first base adjusted by a first randomized factor. A respective second parameter comprises a second base adjusted by a second randomized factor. In some embodiments, the plurality of first parameters are a plurality of driving voltages for the plurality of sub-actions, respectively; and the plurality of second parameters are a plurality of driving durations for the plurality of sub-actions, respectively. The method further includes determining a value of a respective driving voltage; and determining a value of a respective driving duration. Optionally, the value of the respective driving voltage is an addition of a base voltage value and a randomized voltage value; and the value of the respective driving duration is an addition of a base duration value and a randomized duration value.

In some embodiments, the method further includes determining a touch characteristic of the touch thereby classifying the touch into one of the at least two modes.

Figure 6:
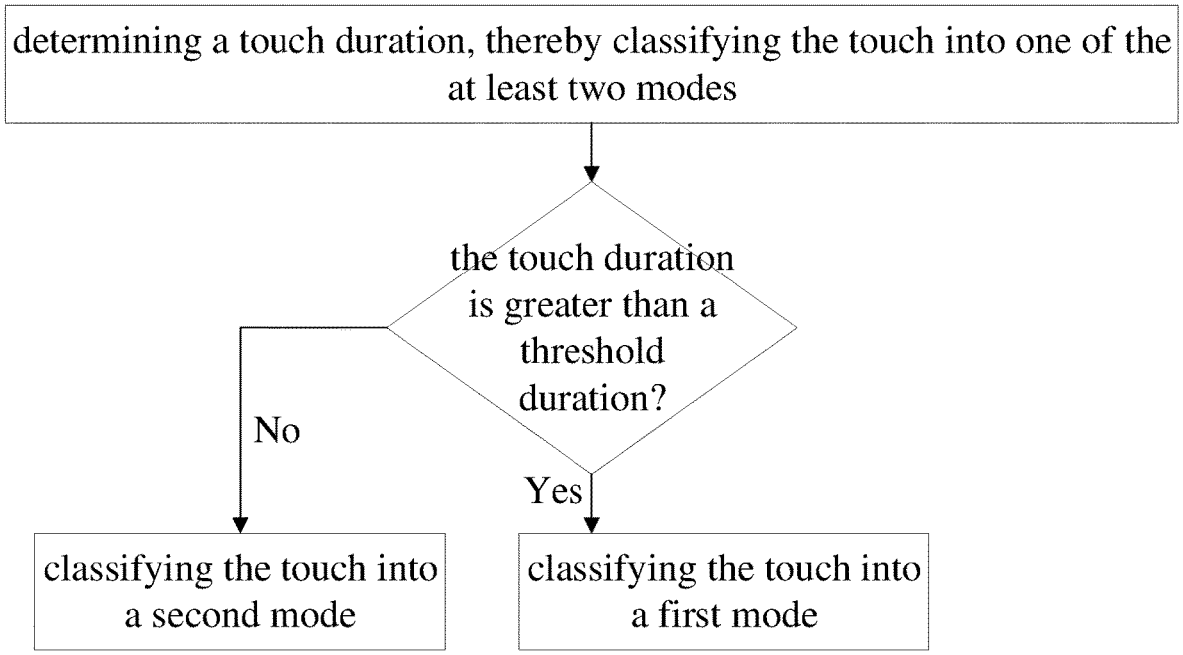
FIG. 6 is a flow chart illustrating a method of operating an electronic apparatus in some embodiments according to the present disclosure.

FIG. 6 is a flow chart illustrating a method of operating an electronic apparatus in some embodiments according to the present disclosure. Referring to FIG. 6, the method in some embodiments further includes determining a touch duration, thereby classifying the touch into one of the at least two modes. Upon determination that the touch duration is greater than a threshold duration, the method includes classifying the touch into a first mode. Upon determination that the touch duration is equal to or less than the threshold duration, the method includes classifying the touch into a second mode.

Figure 7:
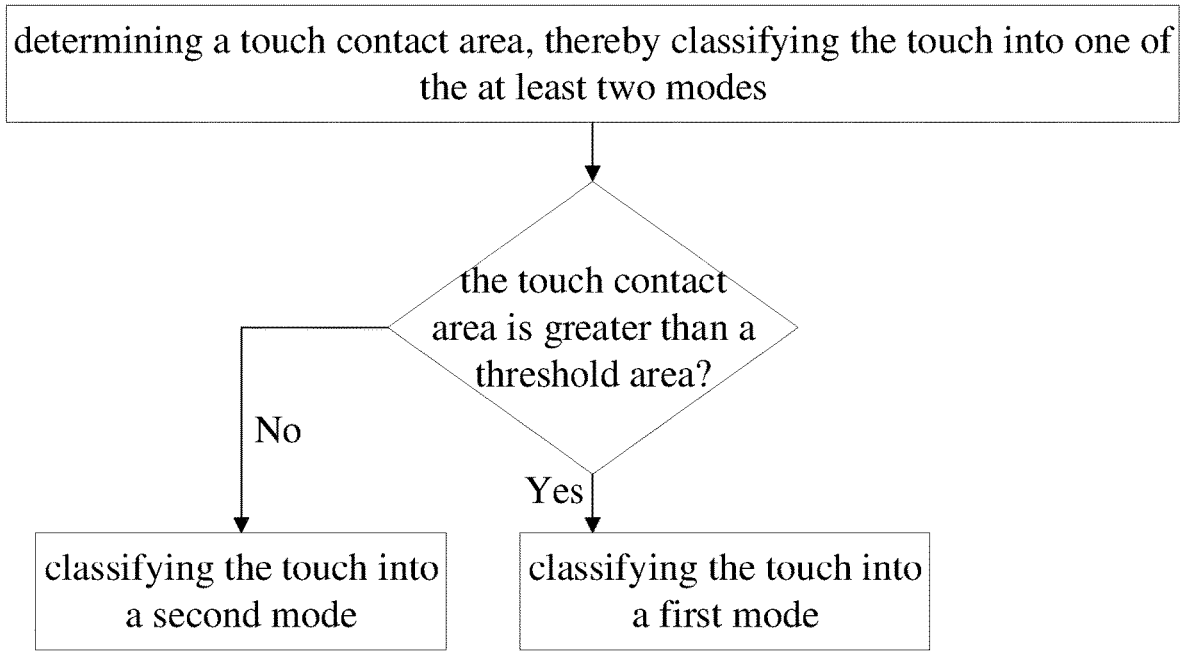
FIG. 7 is a flow chart illustrating a method of operating an electronic apparatus in some embodiments according to the present disclosure.

FIG. 7 is a flow chart illustrating a method of operating an electronic apparatus in some embodiments according to the present disclosure. Referring to FIG. 7, the method in some embodiments further includes determining a touch contact area, thereby classifying the touch into one of the at least two modes. Upon determination that the touch contact area is greater than a threshold area, the method includes classifying the touch into a first mode. Upon determination that the touch contact area is equal to or less than the threshold area, the method includes classifying the touch into a second mode.

Figure 8:
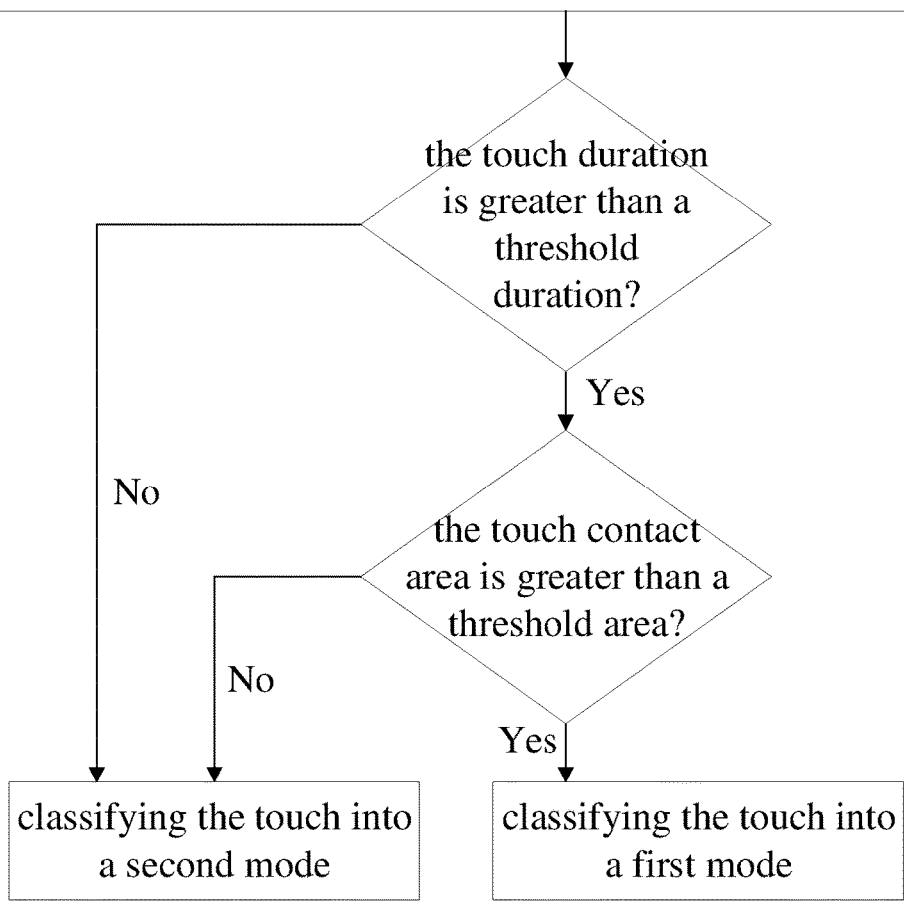
FIG. 8 is a flow chart illustrating a method of operating an electronic apparatus in some embodiments according to the present disclosure.

FIG. 8 is a flow chart illustrating a method of operating an electronic apparatus in some embodiments according to the present disclosure. Referring to FIG. 8, the method in some embodiments further includes determining a touch duration and a touch contact area, thereby classifying the touch into one of the at least two modes. Upon determination that the touch duration is equal to or less than the threshold duration, the method includes classifying the touch into a second mode. Upon determination that the touch duration is greater than a threshold duration, the method includes determining whether the touch contact area is greater than a threshold area. Upon determination that the touch contact area is equal to or less than the threshold area, the method includes classifying the touch into a second mode. Upon determination that the touch duration is greater than the threshold duration, and the touch contact area is greater than a threshold area, the method includes classifying the touch into a first mode.

Figure 9A:
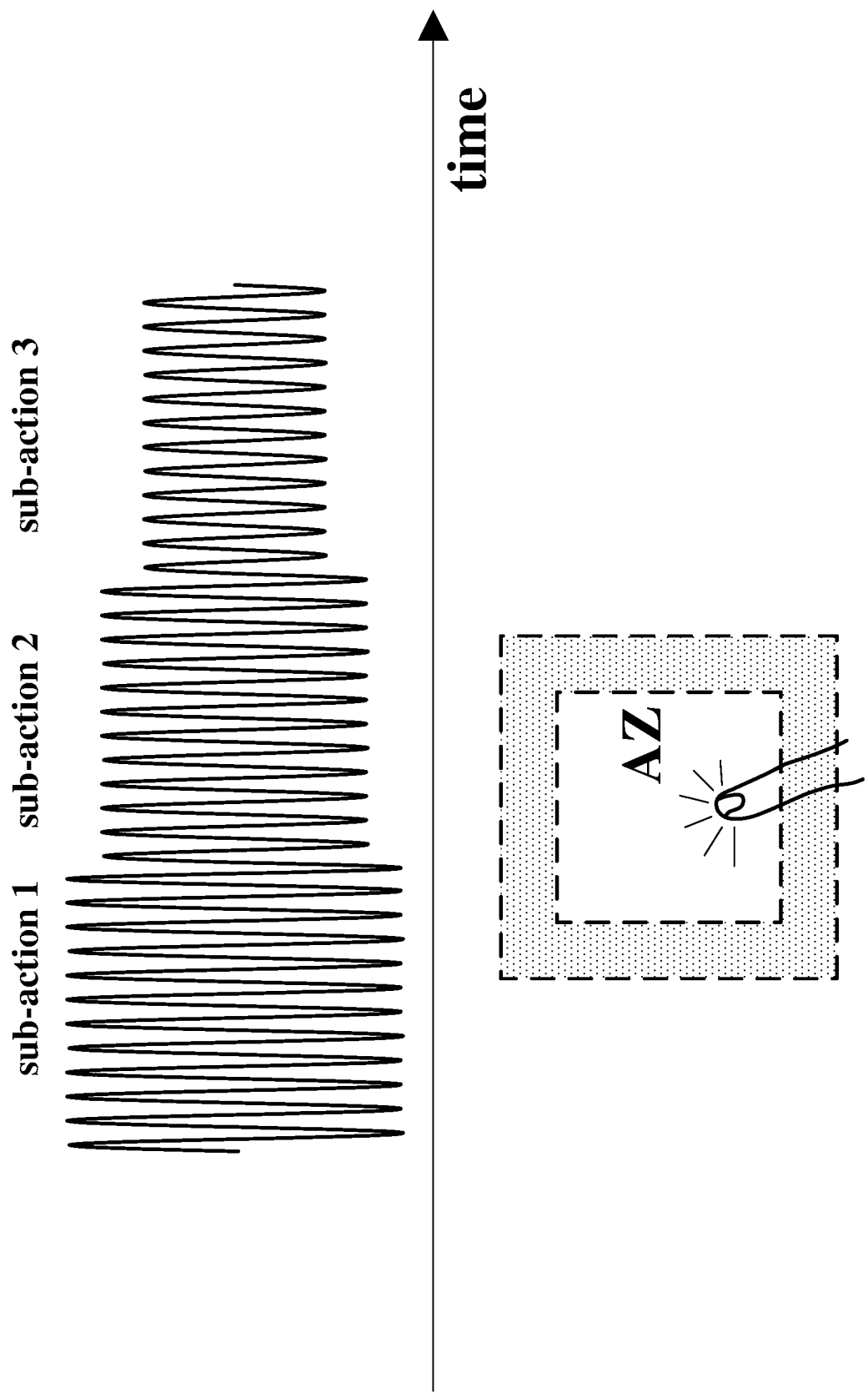
FIG. 9A illustrates a method of driving a haptic device in some embodiments according to the present disclosure.

In some embodiments, producing the haptic action includes producing a continuous action, in which the plurality of sub-actions are consecutive sub-actions without interruption. In some embodiments, the method includes providing signals of a plurality of driving voltages and/or a plurality of driving frequencies to the haptic device to produce the plurality of sub-actions, respectively. In some embodiments, driving voltages for any two consecutive sub-actions of the plurality of sub-actions are different from each other. Differences between the plurality of driving voltages are within a first threshold range. FIG. 9A illustrates a method of driving a haptic device in some embodiments according to the present disclosure. Referring to FIG. 9A, in one example, the plurality of driving voltages for a plurality of sub-actions are different from each other.

Figure 10A:
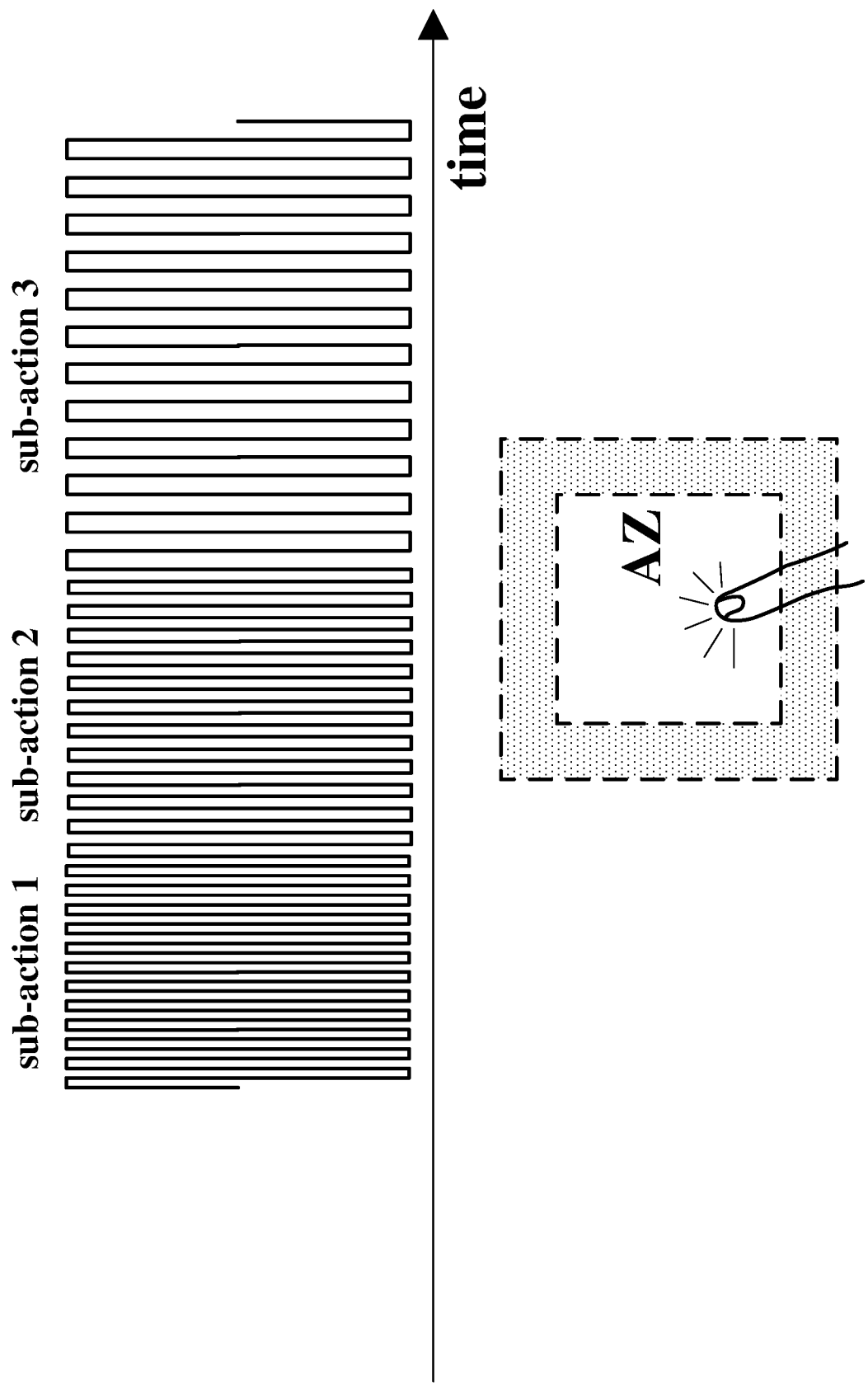
FIG. 10A illustrates a method of driving a haptic device in some embodiments according to the present disclosure.

In some embodiments, driving frequencies for any two consecutive sub-actions of the plurality of sub-actions are different from each other. Differences between the plurality of driving frequencies are within a third threshold range. FIG. 10A illustrates a method of driving a haptic device in some embodiments according to the present disclosure. Referring to FIG. 10A, in one example, the plurality of driving frequencies for a plurality of sub-actions are different from each other.

Figure 10B:
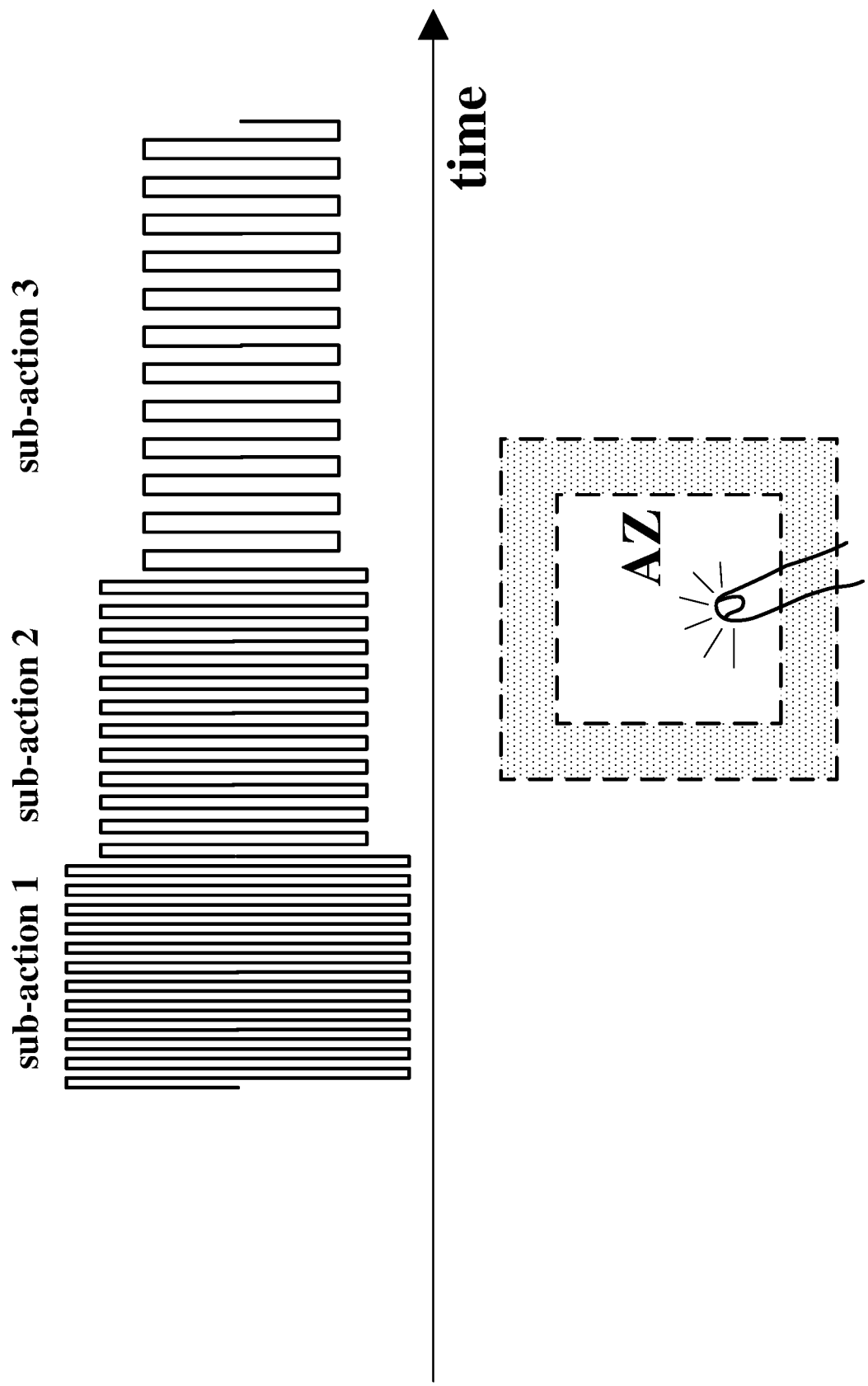
FIG. 10B illustrates a method of driving a haptic device in some embodiments according to the present disclosure.

In some embodiments, driving voltages and driving frequencies for any two consecutive sub-actions of the plurality of sub-actions are different from each other. Differences between the plurality of driving voltages are within a first threshold range; and differences between the plurality of driving frequencies are within a third threshold range. FIG. 10B illustrates a method of driving a haptic device in some embodiments according to the present disclosure. Referring to FIG. 10B, in one example, the plurality of driving voltages and the plurality of driving frequencies for a plurality of sub-actions are different from each other.

In some embodiments, at least two driving durations of a plurality of driving durations for the plurality of sub-actions are different from each other. Optionally, the plurality of driving durations for the plurality of sub-actions are different from each other.

In some embodiments, a plurality of driving durations for the plurality of sub-actions are the same, as exemplified in FIG. 9A.

In some embodiments, a value of a respective driving voltage of the plurality of driving voltages is an addition of a base voltage value and a randomized voltage value. Optionally, base voltage values of the plurality of driving voltages are the same. Optionally, differences between randomized voltage values of the plurality of driving voltages are within the first threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value.

In some embodiments, a value of a respective driving frequency of the plurality of driving frequencies is an addition of a base frequency value and a randomized frequency value. Optionally, base frequency values of the plurality of driving frequencies are the same. Optionally, differences between randomized frequency values of the plurality of driving frequencies are within a third threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base frequency value.

In some embodiments, producing the haptic action includes producing the plurality of sub-actions and at least one inaction. A respective inaction of the at least one inaction is between two consecutive sub-actions. Driving signal for the haptic action accompanying the individual touch action is temporarily discontinued during the at least one inaction.

In some embodiments, the method includes providing signals of a plurality of driving voltages to the haptic device to produce the plurality of sub-actions, respectively; and discontinuing driving voltage during periods of the at least one inaction. In some embodiments, driving voltages for at least two sub-actions of the plurality of sub-actions are different from each other. Optionally, the plurality of driving voltages are different from each other. Differences between the plurality of driving voltages are within a first threshold range.

In some embodiments, the method includes providing signals of a plurality of driving frequencies to the haptic device to produce the plurality of sub-actions, respectively; and discontinuing driving voltage during periods of the at least one inaction. In some embodiments, driving frequencies for at least two sub-actions of the plurality of sub-actions are different from each other. Optionally, the plurality of driving frequencies are different from each other. Differences between the plurality of driving frequencies are within a third threshold range.

In some embodiments, a value of a respective driving voltage of the plurality of driving voltages is an addition of a base voltage value and a randomized voltage value. Optionally, base voltage values of the plurality of driving voltages are the same. Optionally, differences between randomized voltage values of the plurality of driving voltages are within the first threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value.

In some embodiments, a value of a respective driving frequency of the plurality of driving frequencies is an addition of a base frequency value and a randomized frequency value. Optionally, base frequency values of the plurality of driving frequencies are the same. Optionally, differences between randomized frequency values of the plurality of driving frequencies are within a third threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base frequency value.

Figure 9B:
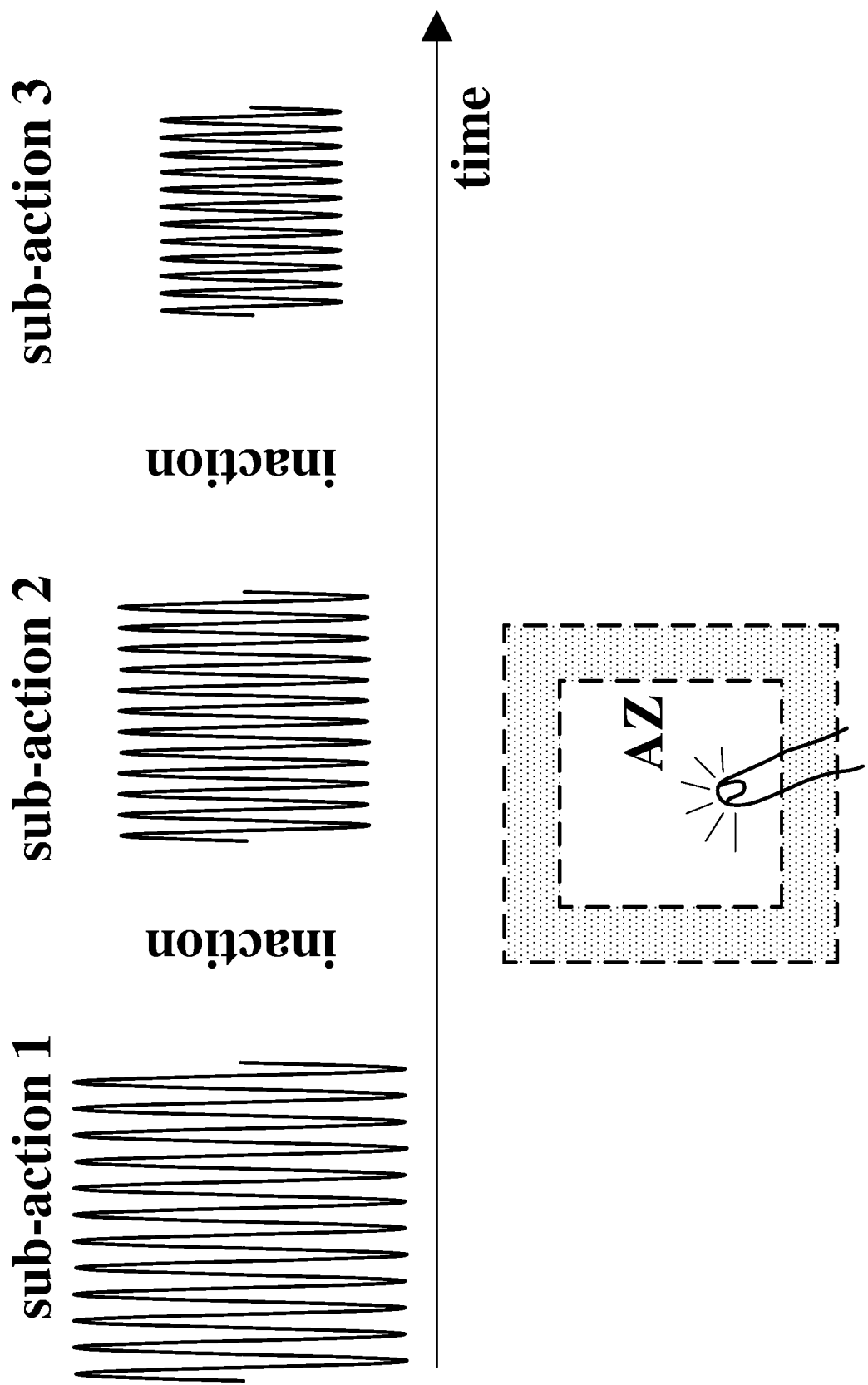
FIG. 9B illustrates a method of driving a haptic device in some embodiments according to the present disclosure.

In some embodiments, at least two driving durations of a plurality of driving durations for the plurality of sub-actions are different from each other. Optionally, the plurality of driving durations for the plurality of sub-actions are different from each other. Accordingly, the method includes providing signals of a plurality of driving voltages, respectively with a plurality of driving durations to the haptic device to produce the plurality of sub-actions, respectively; and discontinuing driving voltage during periods of the at least one inaction. Differences between the plurality of driving voltages are within a first threshold range, and differences between the plurality of driving durations are within a second threshold range. FIG. 9B illustrates a method of driving a haptic device in some embodiments according to the present disclosure. Referring to FIG. 9B, the plurality of driving voltages for the plurality of sub-actions are different from each other, and the plurality of driving durations for the plurality of sub-actions are different from each other.

Figure 10C:
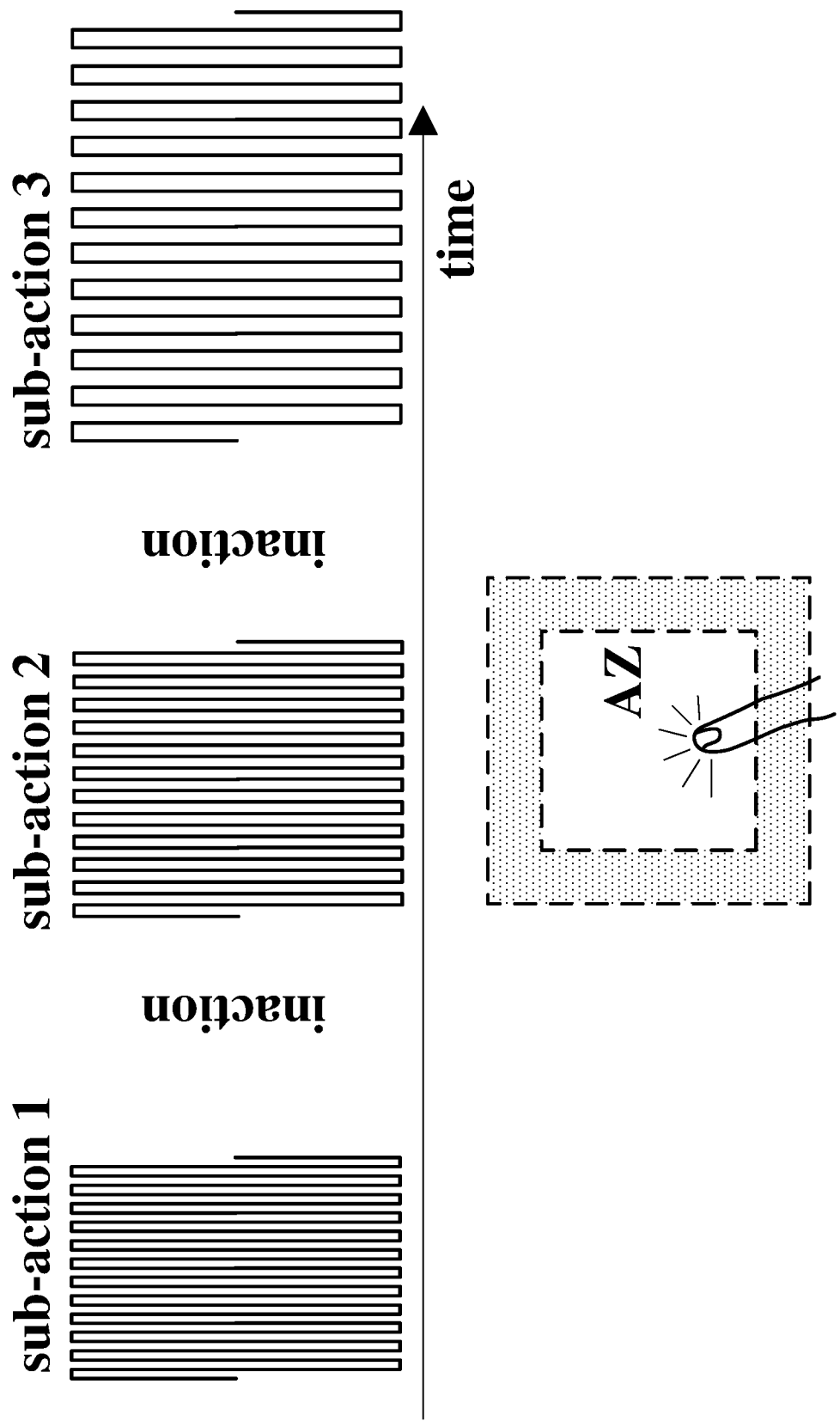
FIG. 10C illustrates a method of driving a haptic device in some embodiments according to the present disclosure.

In some embodiments, the plurality of driving durations for the plurality of sub-actions are different from each other, the method includes providing signals of a plurality of driving frequencies, respectively with a plurality of driving durations to the haptic device to produce the plurality of sub-actions, respectively; and discontinuing driving voltage during periods of the at least one inaction. Differences between the plurality of driving frequencies are within a third threshold range, and differences between the plurality of driving durations are within a second threshold range. FIG. 10C illustrates a method of driving a haptic device in some embodiments according to the present disclosure. Referring to FIG. 10C, the plurality of driving frequencies for the plurality of sub-actions are different from each other, and the plurality of driving durations for the plurality of sub-actions are different from each other.

Figure 10D:
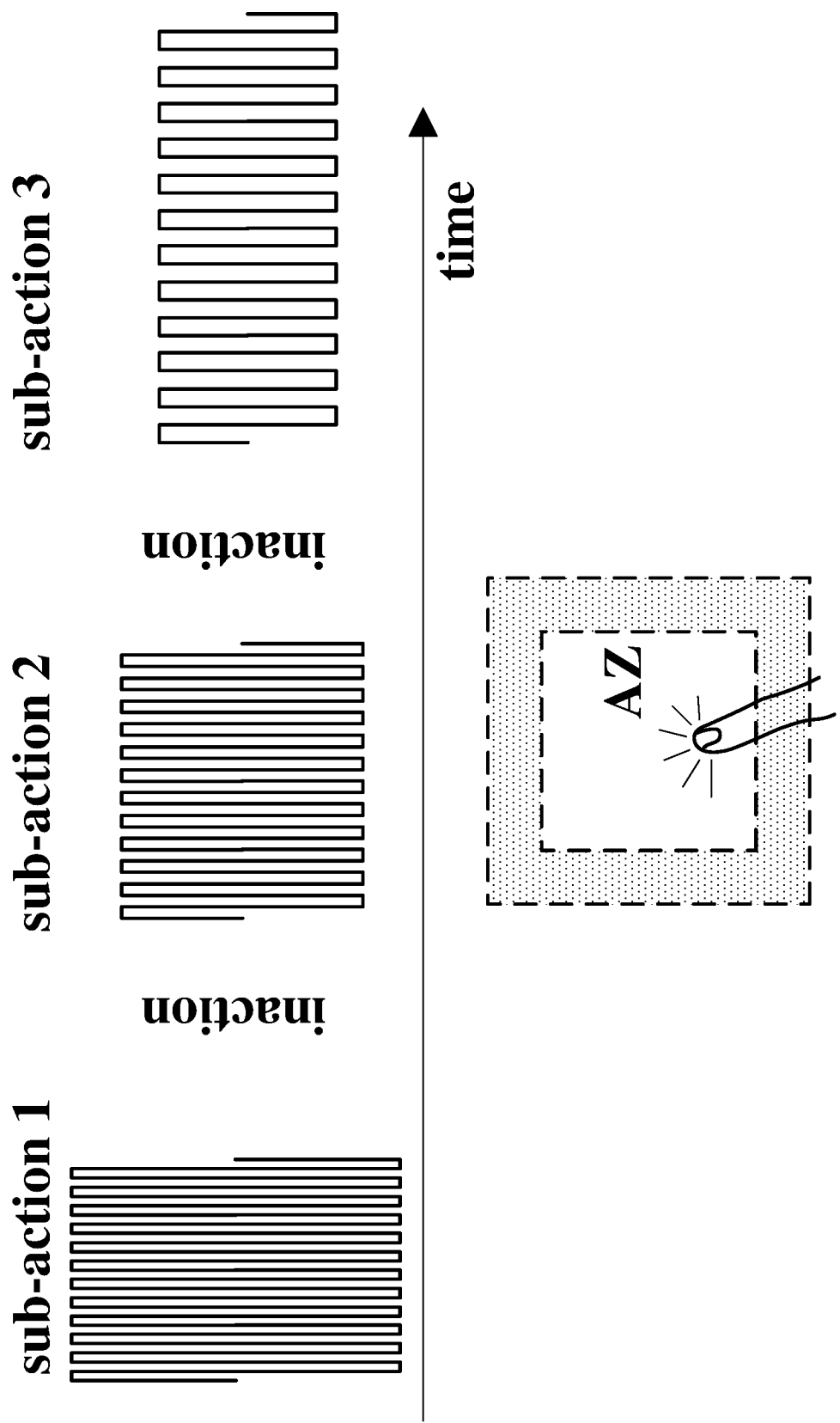
FIG. 10D illustrates a method of driving a haptic device in some embodiments according to the present disclosure.

In some embodiments, the plurality of driving durations for the plurality of sub-actions are different from each other, the method includes providing signals of a plurality of driving voltages with a plurality of driving frequencies, respectively with a plurality of driving durations to the haptic device to produce the plurality of sub-actions, respectively; and discontinuing driving voltage during periods of the at least one inaction. Differences between the plurality of driving voltages are within a first threshold range, differences between the plurality of driving frequencies are within a third threshold range, and differences between the plurality of driving durations are within a second threshold range. FIG. 10D illustrates a method of driving a haptic device in some embodiments according to the present disclosure. Referring to FIG. 10D, the plurality of driving voltages for the plurality of sub-actions are different from each other, the plurality of driving frequencies for the plurality of sub-actions are different from each other, and the plurality of driving durations for the plurality of sub-actions are different from each other.

In some embodiments, a value of a respective driving voltage of the plurality of driving voltages is an addition of a base voltage value and a randomized voltage value; and a value of a respective driving duration of the plurality of driving durations is an addition of a base duration value and a randomized duration value. Base voltage values of the plurality of driving voltages are the same; and base duration values of the plurality of driving durations are the same. Optionally, differences between randomized voltage values of the plurality of driving voltages are within the first threshold range; and differences between randomized duration values of the plurality of driving durations are within the second threshold range. In one example, the differences between randomized voltage values of the plurality of driving voltages are within 50% (e.g., within 45%, within 40%, within 35%, within 30%, within 25%, within 20%, within 15%, within 10%, within 5%, or within 1%) of the base voltage value. In another example, the differences between randomized duration values of the plurality of driving duration are within 50% (e.g., within 45%, within 40%, within 35%, within 30%, within 25%, within 20%, within 15%, within 10%, within 5%, or within 1%) of the base duration value.

In some embodiments, a value of a respective driving frequency of the plurality of driving frequencies is an addition of a base frequency value and a randomized frequency value; and a value of a respective driving duration of the plurality of driving durations is an addition of a base duration value and a randomized duration value. Base frequency values of the plurality of driving frequencies are the same; and base duration values of the plurality of driving durations are the same. Optionally, differences between randomized frequency values of the plurality of driving frequencies are within a third threshold range; and differences between randomized duration values of the plurality of driving durations are within the second threshold range. In one example, the differences between randomized frequency values of the plurality of driving frequencies are within 50% (e.g., within 45%, within 40%, within 35%, within 30%, within 25%, within 20%, within 15%, within 10%, within 5%, or within 1%) of the base frequency value. In another example, the differences between randomized duration values of the plurality of driving duration are within 50% (e.g., within 45%, within 40%, within 35%, within 30%, within 25%, within 20%, within 15%, within 10%, within 5%, or within 1%) of the base duration value.

Figure 9C:
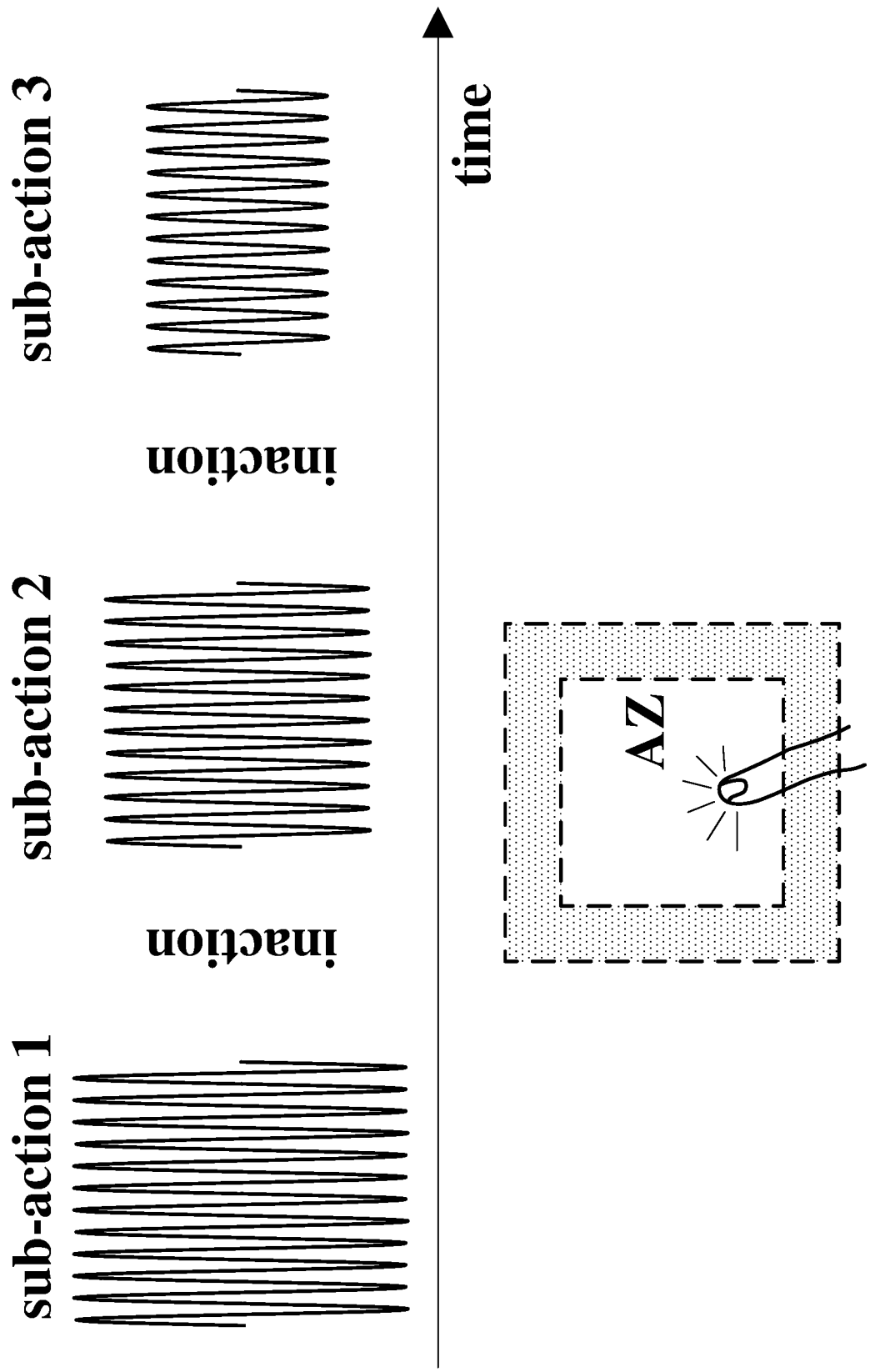
FIG. 9C illustrates a method of driving a haptic device in some embodiments according to the present disclosure.

In some embodiments, a plurality of driving durations for the plurality of sub-actions are the same. Accordingly, the method includes providing a plurality of driving voltages each with a same driving duration to the haptic device to produce the plurality of sub-actions, respectively; and discontinuing driving voltage during periods of the at least one inaction. FIG. 9C illustrates a method of driving a haptic device in some embodiments according to the present disclosure. Referring to FIG. 9C, the plurality of driving voltages are different from each other, and the plurality of driving durations are the same.

In some embodiments, the method includes providing a plurality of driving voltages respectively with a plurality of driving durations to the haptic device to produce the plurality of sub-actions, respectively; and discontinuing driving voltage during periods of the at least one inaction. In some embodiments, driving durations for at least two sub-actions of the plurality of sub-actions are different from each other. Optionally, the plurality of driving durations are different from each other. Differences between the plurality of driving durations are within a second threshold range.

In some embodiments, a value of a respective driving duration of the plurality of driving durations is an addition of a base duration value and a randomized duration value. Optionally, base duration values of the plurality of driving durations are the same. Optionally, differences between randomized duration values of the plurality of driving durations are within the second threshold range. In one example, the differences between randomized duration values of the plurality of driving durations are within 50% (e.g., within 45%, within 40%, within 35%, within 30%, within 25%, within 20%, within 15%, within 10%, within 5%, or within 1%) of the base duration value.

In some embodiments, at least two driving voltages of a plurality of driving voltages for the plurality of sub-actions are different from each other. Optionally, the plurality of driving voltages for the plurality of sub-actions are different from each other. Referring to FIG. 9B, the plurality of driving durations for the plurality of sub-actions are different from each other, and the plurality of driving voltages for the plurality of sub-actions are different from each other.

In some embodiments, at least two driving frequencies of a plurality of driving frequencies for the plurality of sub-actions are different from each other. Referring to FIG. 10C, the plurality of driving durations for the plurality of sub-actions are different from each other, and the plurality of driving frequencies for the plurality of sub-actions are different from each other.

In some embodiments, at least two driving voltages of a plurality of driving voltages and at least two driving frequencies of a plurality of driving frequencies for the plurality of sub-actions are different from each other. Referring to FIG. 10D, the plurality of driving durations for the plurality of sub-actions are different from each other, the plurality of driving voltages for the plurality of sub-actions are different from each other, and the plurality of driving frequencies for the plurality of sub-actions are different from each other.

Figure 9D:
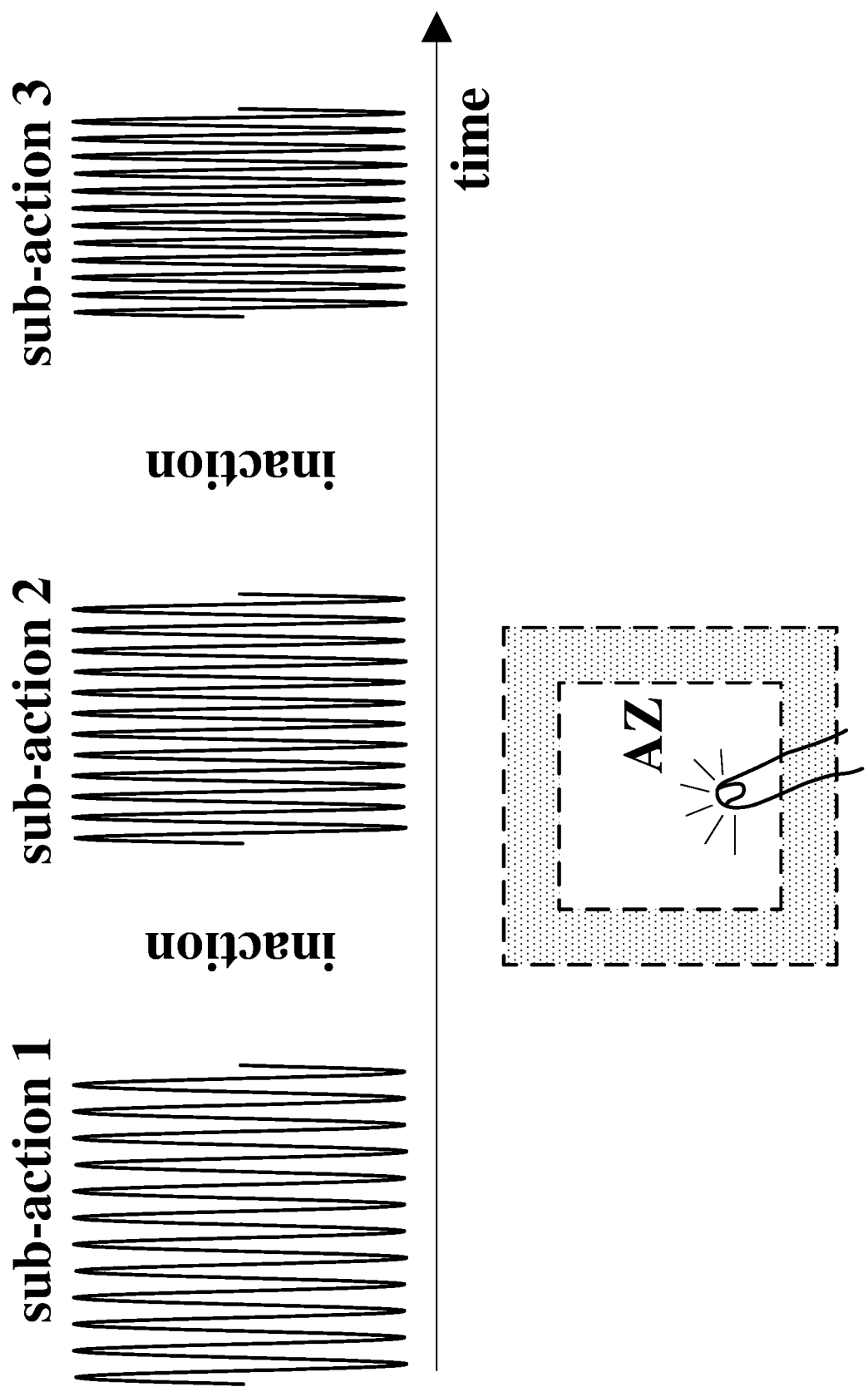
FIG. 9D illustrates a method of driving a haptic device in some embodiments according to the present disclosure.

In some embodiments, a plurality of driving voltages for the plurality of sub-actions are the same. FIG. 9D illustrates a method of driving a haptic device in some embodiments according to the present disclosure. Referring to FIG. 9D, the plurality of driving durations are different from each other, and the plurality of driving voltages are the same.

In some embodiments, a plurality of driving frequencies for the plurality of sub-actions are the same.

In some embodiments, a plurality of driving voltages and a plurality of driving frequencies for the plurality of sub-actions are the same.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An electronic apparatus, comprising:
a touch control device configured to detect a touch;
a processor configured to classify the touch into one of at least two modes;
a haptic device configured to produce a haptic action accompanying an individual touch action; and
a driving circuit configured to drive the haptic device;
wherein the processor is configured to, upon determination that the touch is of a first mode, transmit a first driving signal to the driving circuit;
the driving circuit is configured to, upon receiving the first driving signal, drive the haptic device to produce a plurality of sub-actions cumulatively achieving at least a part of the haptic action accompanying the individual touch action; and at least two sub-actions of the plurality of sub-actions are different from each other in at least one parameter.

2. The electronic apparatus of claim 1, wherein at least two consecutive sub-actions of the plurality of sub-actions are different from each other in at least one parameters.

3. The electronic apparatus of claim 1, wherein the at least one parameter is a driving voltage of a signal provided to the haptic device for a respective sub-action of the plurality of sub-actions, or a driving frequency of a signal provided to the haptic device for the respective sub-action, or a driving duration for the respective sub-action, or a combination thereof.

4. The electronic apparatus of claim 1, wherein the haptic action is a continuous action, and the plurality of sub-actions are consecutive sub-actions without interruption.

5. The electronic apparatus of claim 4, wherein the plurality of sub-actions are characterized by a plurality of driving voltages and/or a plurality of driving frequencies for the plurality of sub-actions, respectively;
driving voltages and/or driving frequencies for any two consecutive sub-actions of the plurality of sub-actions are different from each other; and
differences between the plurality of driving voltages and/or the plurality of driving frequencies are within a threshold range.

6. The electronic apparatus of claim 5, wherein a value of a respective driving voltage of the plurality of driving voltages is an addition of a base voltage value and a randomized voltage value;
base voltage values of the plurality of driving voltages are the same; and
differences between randomized voltage values of the plurality of driving voltages are within a first threshold range.

7. The electronic apparatus of claim 5, wherein a value of a respective driving frequency of the plurality of driving frequencies is an addition of a base frequency value and a randomized frequency value;
base frequency values of the plurality of driving frequencies are the same; and
differences between randomized frequency values of the plurality of driving frequencies are within a third threshold range.

8. The electronic apparatus of claim 1, wherein the haptic action further comprises at least one inaction;
a respective inaction is between two consecutive sub-actions; and
driving signal for the haptic action accompanying the individual touch action is temporarily discontinued during the at least one inaction.

9. The electronic apparatus of claim 8, wherein the plurality of sub-actions are characterized by a plurality of driving voltages and/or a plurality of driving frequencies for the plurality of sub-actions, respectively;
driving voltages and/or driving frequencies for at least two sub-actions of the plurality of sub-actions are different from each other; and
differences between the plurality of driving voltages and/or the plurality of driving frequencies are within a threshold range.

10. The electronic apparatus of claim 9, wherein a value of a respective driving voltage of the plurality of driving voltages is an addition of a base voltage value and a randomized voltage value;
base voltage values of the plurality of driving voltages are the same; and differences between randomized voltage values of the plurality of driving voltages are within a first threshold range.

11. The electronic apparatus of claim 9, wherein a value of a respective driving frequency of the plurality of driving frequencies is an addition of a base frequency value and a randomized frequency value;
base frequency values of the plurality of driving frequencies are the same; and
differences between randomized frequency values of the plurality of driving frequencies are within a third threshold range.

12. The electronic apparatus of claim 9, wherein at least two driving durations of a plurality of driving durations for the plurality of sub-actions are different from each other.

13. The electronic apparatus of claim 12, wherein a value of a respective driving duration of the plurality of driving durations is an addition of a base duration value and a randomized duration value;
base duration values of the plurality of driving durations are the same; and
differences between randomized duration values of the plurality of driving durations are within a second threshold range.

14. The electronic apparatus of claim 12, wherein at least two driving voltages of a plurality of driving voltages and/or at least two driving frequencies of a plurality of driving frequencies for the plurality of sub-actions are different from each other.

15. The electronic apparatus of claim 14, wherein the processor is configured to determine a touch contact area or a touch duration or a combination thereof, thereby classifying the touch into one of the at least two modes;
the processor is configured to determine whether a touch duration is greater than a threshold duration or whether a touch contact area is greater than a threshold area; and
upon determination that the touch duration is greater than the threshold duration or that the touch contact area is greater than the threshold area, the processor is configured to classify the touch into the first mode.

16. The electronic apparatus of claim 12, wherein a plurality of driving voltages and/or a plurality of driving frequencies for the plurality of sub-actions are the same.

17. The electronic apparatus of claim 9, wherein a plurality of driving durations for the plurality of sub-actions are the same.

18. The electronic apparatus of claim 8, wherein the plurality of sub-actions are characterized by a plurality of driving durations for the plurality of sub-actions, respectively;
driving durations for at least two sub-actions of the plurality of sub-actions are different from each other; and
differences between the plurality of driving durations are within a second threshold range.

19. The electronic apparatus of claim 1, wherein the processor is configured to determine a touch characteristic of the touch thereby classifying the touch into one of the at least two modes.

20. A method of operating an electronic apparatus, comprising:
detecting a touch;
classifying the touch into one of at least two modes;
producing, by a haptic device, a haptic action accompanying an individual touch action;
driving the haptic device by a driving circuit;
upon determination that the touch is of a first mode, transmitting a first driving signal to the driving circuit; and
upon receiving the first driving signal by the driving circuit, driving the haptic device to produce a plurality of sub-actions cumulatively achieving at least a part of the haptic action accompanying the individual touch action;
wherein at least two sub-actions of the plurality of sub-actions are different from each other in at least one parameter.

* * * * *